(12) United States Patent
Wang et al.

(10) Patent No.: US 11,817,700 B1
(45) Date of Patent: Nov. 14, 2023

(54) DECENTRALIZED ELECTRICAL POWER ALLOCATION SYSTEM

(71) Applicant: General Electric Company, Schenectady, NY (US)

(72) Inventors: Honggang Wang, Clifton Park, NY (US); Sumit Bose, Niskayuna, NY (US); Hanchao Liu, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/869,291

(22) Filed: Jul. 20, 2022

(51) Int. Cl.
*H02J 1/10* (2006.01)
*H02J 3/00* (2006.01)
*H02J 3/38* (2006.01)

(52) U.S. Cl.
CPC .............. *H02J 1/109* (2020.01); *H02J 3/003* (2020.01); *H02J 3/381* (2013.01); *H02J 2300/30* (2020.01); *H02J 2300/40* (2020.01); *H02J 2310/44* (2020.01)

(58) Field of Classification Search
CPC ....................................................... H02J 3/46
See application file for complete search history.

(56) References Cited

U.S. PATENT DOCUMENTS

| | | |
|---|---|---|
| 3,658,279 A | 4/1972 | Robertson |
| 3,805,517 A | 4/1974 | Sewell et al. |
| 4,684,081 A | 8/1987 | Cronin |
| 5,227,256 A | 7/1993 | Marianowski et al. |
| 5,581,995 A | 12/1996 | Lucenko et al. |
| 5,858,314 A | 1/1999 | Hsu et al. |
| 5,968,680 A | 10/1999 | Wolfe et al. |

(Continued)

FOREIGN PATENT DOCUMENTS

| | | |
|---|---|---|
| CA | 2446360 A1 | 4/2004 |
| CN | 100367556 C | 2/2008 |

(Continued)

OTHER PUBLICATIONS

Babu D et al., Optimization of Pattern Factor of the Annular Gas Turbine Combustor for Better Turbine Life, IOSR Journal of Mechanical and Civil Engineering, pp. 30-35.

(Continued)

*Primary Examiner* — Daniel Kessie
(74) *Attorney, Agent, or Firm* — Dority & Manning, P.A.

(57) ABSTRACT

A decentralized electrical power allocation system is provided. The system includes a power bus, electric power consumers, and at least two power source assemblies. Each power source assembly includes a power controller and a power source. Each power controller is configured to execute an adaptive droop control scheme so as to cause their respective power sources to output power to meet a power demand on the power bus applied by the power consumers. The power output of a given power source is controlled based at least in part on correlating a power feedback of the given power source with a droop function that represents an efficiency of the given power source to generate electrical power for a given power output. The droop functions are collaboratively defined so that one power source shares more output at lower power levels while another power source shares more output at higher power levels.

19 Claims, 13 Drawing Sheets

(56) References Cited

U.S. PATENT DOCUMENTS

| | | |
|---|---|---|
| 6,183,703 B1 | 2/2001 | Hsu et al. |
| 6,296,957 B1 | 10/2001 | Graage |
| 6,348,278 B1 | 2/2002 | LaPierre et al. |
| 6,630,264 B2 | 10/2003 | Haltiner, Jr. et al. |
| 6,641,084 B1 | 11/2003 | Huber et al. |
| 6,834,831 B2 | 12/2004 | Daggett |
| 7,239,035 B2 | 7/2007 | Garces et al. |
| 7,279,243 B2 | 10/2007 | Haltiner, Jr. et al. |
| 7,285,350 B2 | 10/2007 | Keefer et al. |
| 7,380,749 B2 | 6/2008 | Fucke et al. |
| 7,456,517 B2 | 11/2008 | Campbell et al. |
| 7,470,477 B2 | 12/2008 | Zizelman et al. |
| 7,513,119 B2 | 4/2009 | Zielinski et al. |
| 7,578,136 B2 | 8/2009 | Derouineau et al. |
| 7,659,021 B2 | 2/2010 | Horiuchi et al. |
| 7,709,118 B2 | 5/2010 | Lundberg |
| 7,743,499 B2 | 6/2010 | Pettit et al. |
| 7,781,115 B2 | 8/2010 | Lundberg |
| 7,854,582 B2 | 12/2010 | Ullyott |
| 7,926,287 B2 | 4/2011 | Ullyott et al. |
| 7,966,801 B2 | 6/2011 | Umeh et al. |
| 7,966,830 B2 | 6/2011 | Daggett |
| 8,137,854 B2 | 3/2012 | Gans |
| 8,141,360 B1 | 3/2012 | Huber |
| 8,232,670 B2 | 7/2012 | Breit et al. |
| 8,268,510 B2 | 9/2012 | Rock et al. |
| 8,288,060 B2 | 10/2012 | Bae et al. |
| 8,309,270 B2 | 11/2012 | Finnerty et al. |
| 8,373,381 B2 | 2/2013 | Raiser et al. |
| 8,394,552 B2 | 3/2013 | Gummalla et al. |
| 8,524,412 B2 | 9/2013 | Rock et al. |
| 8,722,270 B2 | 5/2014 | Pastula et al. |
| 8,727,270 B2 | 5/2014 | Burns et al. |
| 8,732,532 B2 | 5/2014 | Higeta |
| 8,820,677 B2 | 9/2014 | Rajashekara et al. |
| 8,846,255 B2 | 9/2014 | Dineen |
| 8,875,519 B2 | 11/2014 | Dooley |
| 8,950,703 B2 | 2/2015 | Bayliss et al. |
| 9,005,847 B2 | 4/2015 | Rock et al. |
| 9,028,990 B2 | 5/2015 | Gans et al. |
| 9,054,385 B2 | 6/2015 | Jones et al. |
| 9,059,440 B2 | 6/2015 | Hotto |
| 9,068,748 B2 | 6/2015 | Hoke |
| 9,118,054 B2 | 8/2015 | Gummalla et al. |
| 9,347,379 B2 | 5/2016 | Dooley |
| 9,359,956 B2 | 6/2016 | Dooley |
| 9,435,230 B2 | 9/2016 | Kim et al. |
| 9,444,108 B2 | 9/2016 | Brousseau |
| 9,464,573 B2 | 10/2016 | Remy et al. |
| 9,541,001 B2 | 1/2017 | Steinwandel et al. |
| 9,604,730 B2 | 3/2017 | Hagh et al. |
| 9,617,006 B2 | 4/2017 | Brugger et al. |
| 9,666,888 B2 | 5/2017 | Nagai et al. |
| 9,777,638 B2 | 10/2017 | Freidl |
| 9,897,041 B2 | 2/2018 | Hoffjann et al. |
| 9,966,619 B2 | 5/2018 | Libis et al. |
| 10,008,726 B2 | 6/2018 | Leah et al. |
| 10,035,607 B2 | 7/2018 | Wangemann et al. |
| 10,069,150 B2 | 9/2018 | Mata et al. |
| 10,224,556 B2 | 3/2019 | Lents et al. |
| 10,318,003 B2 | 6/2019 | Gannon et al. |
| 10,443,504 B2 | 10/2019 | Dalal |
| 10,446,858 B2 | 10/2019 | Palumbo et al. |
| 10,487,839 B2 | 11/2019 | Kupiszewski et al. |
| 10,622,653 B2 | 4/2020 | Whyatt et al. |
| 10,641,179 B2 | 5/2020 | Hayama et al. |
| 10,644,331 B2 | 5/2020 | Stoia et al. |
| 10,671,092 B2 | 6/2020 | DiRusso et al. |
| 10,676,208 B2 | 6/2020 | Wangemann et al. |
| 10,724,432 B2 | 7/2020 | Shapiro et al. |
| 10,737,802 B2 | 8/2020 | Krug et al. |
| 10,762,726 B2 | 9/2020 | Gansler et al. |
| 10,766,629 B2 | 9/2020 | Mercier-Calvairac et al. |
| 10,774,741 B2 | 9/2020 | Sennoun |
| 10,814,992 B2 | 10/2020 | Halsey et al. |
| 10,913,543 B2 | 2/2021 | Bailey et al. |
| 10,919,635 B2 | 2/2021 | Edgar et al. |
| 10,950,875 B1 | 3/2021 | Radhakrishnan et al. |
| 10,967,984 B2 | 4/2021 | Willford et al. |
| 10,978,723 B2 | 4/2021 | Lo et al. |
| 11,015,480 B2 | 5/2021 | Waun |
| 11,114,855 B2 | 9/2021 | Handelsman et al. |
| 2002/0163819 A1 | 11/2002 | Treece |
| 2004/0081871 A1 | 4/2004 | Kearl et al. |
| 2004/0150366 A1 | 8/2004 | Ferrall et al. |
| 2006/0010866 A1 | 1/2006 | Rehg et al. |
| 2008/0155984 A1 | 7/2008 | Liu et al. |
| 2010/0133475 A1 | 6/2010 | Kobayashi et al. |
| 2010/0138070 A1 | 6/2010 | Beaudoin |
| 2010/0159303 A1 | 6/2010 | Rock et al. |
| 2011/0071707 A1 | 3/2011 | Crumm et al. |
| 2012/0161512 A1 | 6/2012 | Metzler et al. |
| 2012/0301814 A1 | 11/2012 | Beasley et al. |
| 2013/0099560 A1 | 4/2013 | Shipley et al. |
| 2013/0280634 A1 | 10/2013 | Park et al. |
| 2014/0023945 A1 | 1/2014 | Epstein et al. |
| 2014/0325991 A1 | 11/2014 | Liew et al. |
| 2014/0358474 A1* | 12/2014 | Hall ............... G06F 17/142 |
| | | 702/145 |
| 2015/0030947 A1 | 1/2015 | Saunders et al. |
| 2015/0151844 A1 | 6/2015 | Anton et al. |
| 2016/0260991 A1 | 9/2016 | Shapiro et al. |
| 2017/0070088 A1 | 3/2017 | Bernsten et al. |
| 2018/0003072 A1 | 1/2018 | Lents et al. |
| 2018/0141675 A1 | 5/2018 | Halsey et al. |
| 2018/0166734 A1 | 6/2018 | Linde et al. |
| 2018/0319283 A1 | 11/2018 | Battin et al. |
| 2019/0121369 A1 | 4/2019 | DiRusso et al. |
| 2019/0136761 A1 | 5/2019 | Shapiro et al. |
| 2019/0145273 A1 | 5/2019 | Frank et al. |
| 2020/0014044 A1 | 1/2020 | Tichy et al. |
| 2020/0062414 A1 | 2/2020 | Hon et al. |
| 2020/0063599 A1 | 2/2020 | Waun |
| 2020/0136163 A1 | 4/2020 | Holland et al. |
| 2020/0149479 A1 | 5/2020 | Des Roches-Dionne et al. |
| 2020/0194799 A1 | 6/2020 | Hart et al. |
| 2020/0313207 A1 | 10/2020 | Milcarek et al. |
| 2021/0003281 A1 | 1/2021 | Amble et al. |
| 2021/0075034 A1 | 3/2021 | Irie et al. |
| 2021/0115857 A1 | 4/2021 | Collopy |
| 2022/0109306 A1* | 4/2022 | Nakakita ............ H02J 3/48 |
| 2022/0190606 A1* | 6/2022 | Venkatesh ......... H02J 3/46 |

FOREIGN PATENT DOCUMENTS

| | | |
|---|---|---|
| CN | 106976405 A | 7/2017 |
| DE | 102005012230 A1 | 10/2005 |
| DE | 10200950812 B4 | 4/2017 |
| EP | 2800186 B1 | 2/2018 |
| EP | 3336948 B1 | 9/2019 |
| EP | 3805107 A1 | 4/2021 |
| JP | 2009187756 A | 8/2009 |
| JP | 2011002308 A | 1/2011 |
| JP | 2018087501 A | 6/2018 |
| KR | 20090064853 A | 6/2009 |
| WO | WO9965097 A1 | 12/1999 |
| WO | WO2018108962 A1 | 6/2018 |
| WO | WO2019160036 A1 | 8/2019 |
| WO | WO2020/011380 A1 | 1/2020 |

OTHER PUBLICATIONS

Cocker et al., 3D Printing Cuts Fuel Cell Component Costs, Energy and Environmental Science Article featured in Chemistry World, Jul. 3, 2014, 3 Pages. https://www.chemistryworld.com/news/3d-printing-cuts-fuel-cell-component-costs/7526.article.

Code of Federal Regulations, National Archives, Title 14, Chapter I, Subchapter C, Part 33, §33.75 Safety Analysis, 2007, refer to p. 25 of 50. https://www.ecfr.gov/cgi-bin/text-idx?SID=5ela000b517423bb51a8f713ca21lb68&mc=tme&node=pt14.1.33&rgn=div5#se14.1.33_175.

(56) References Cited

OTHER PUBLICATIONS

Feiner, Power-by-Wire Aircraft Secondary Power Systems, AIAA/IEEE Digital Avionics Systems Conference, 1993, pp. 439-444. (Abstract Only).

Honegger, Gas Turbine Combustion Modeling for a Parametric Emissions Monitoring System, Thesis Kansas State University College of Engineering, Manhattan Kansas, 2004, 97 Pages. https://core.ac.uk/download/pdf/5164453.pdf.

Krishnan, Recent Developments in Metal-Supported Solid Oxide Fuel Cells, Wires Energy and Environment, vol. 6, Issue 5, Mar. 30, 2017, 34 Pages. (Abstract Only) https://doi.org/10.1002/wene.246.

Mark et al., Design and Analysis of Annular Combustion Chamber of a Low Bypass Turbofan Engine in a Jet Trainer Aircraft, Propulsion and Power Research, vol. 5, Issue 2, 2015, pp. 97-107.

Thorud, Dynamic Modelling and Characterisation of a Solid Oxide Fuel Cell Integrated in a Gas Turbine Cycle, Trondheim, NTNU, Oct. 2005, 278 Pages.

Turbine Engine Relighting in Flight, Certification Memorandum, CM-PIFS-010, European Aviation Safety Agency (EASA), Issue 1, Apr. 29, 2015, 6 Pages.

Whyatt et al., Electrical Generation for More-Electric Aircraft Using Solid Oxide Fuel Cells, No. PNNL-21382, Pacific Northwest National Lab (PNNL), Richland WA, 2012, 110 Pages. https://www.energy.gov/sites/prod/files/2014/03/f9/sofc_for_aircraft_pnnl_2012.pdf.

\* cited by examiner

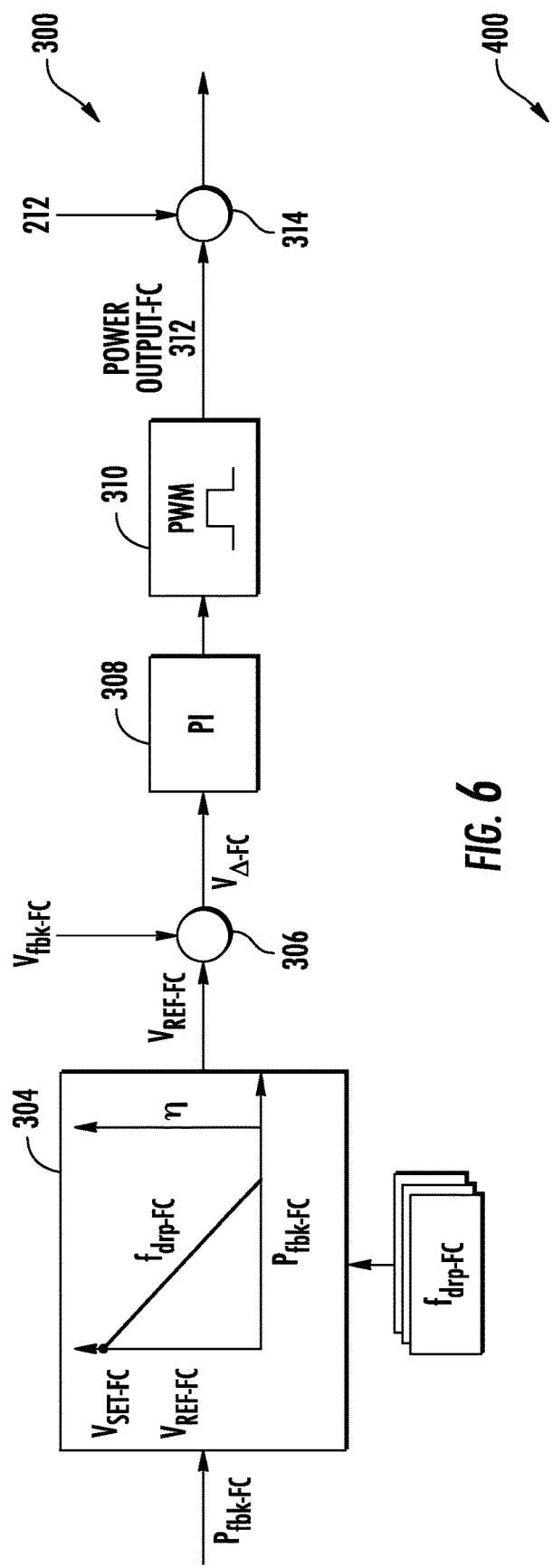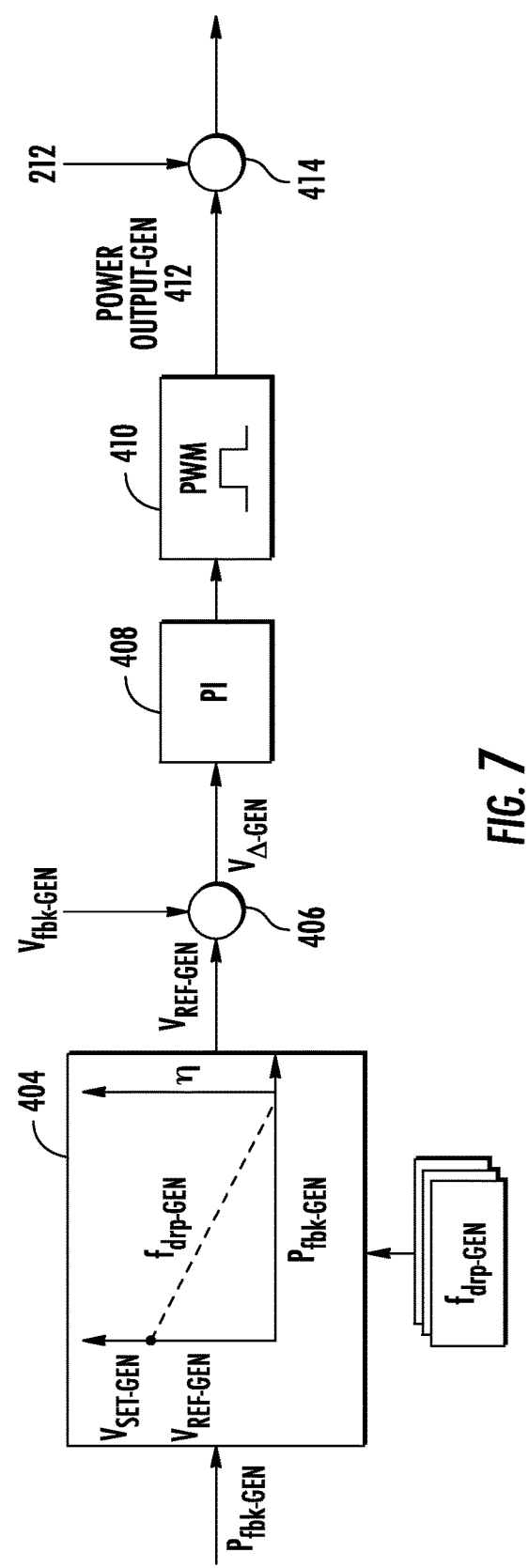

US 11,817,700 B1

DECENTRALIZED ELECTRICAL POWER ALLOCATION SYSTEM

FIELD

The present disclosure relates to electrical power systems for vehicles, such as aircraft.

BACKGROUND

Aircraft and other vehicles can include electrical power systems that include power sources that provide electric power to power consumers. Conventionally, a centralized approach has been taken to allocate the power output from each power source to meet the power demand of the power consumers. For instance, supervisor controllers have been used to determine the load share that each power source is responsible to output in order to meet the power demand of the power consumers. Such conventional systems may have certain drawbacks.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIG. 6 provides a logic flow diagram for allocating power to be output by a first power source of the electrical power system of FIG. 5;

FIG. 7 provides a logic flow diagram for allocating power to be output by a second power source of the electrical power system of FIG. 5;

DETAILED DESCRIPTION

Figure 1:
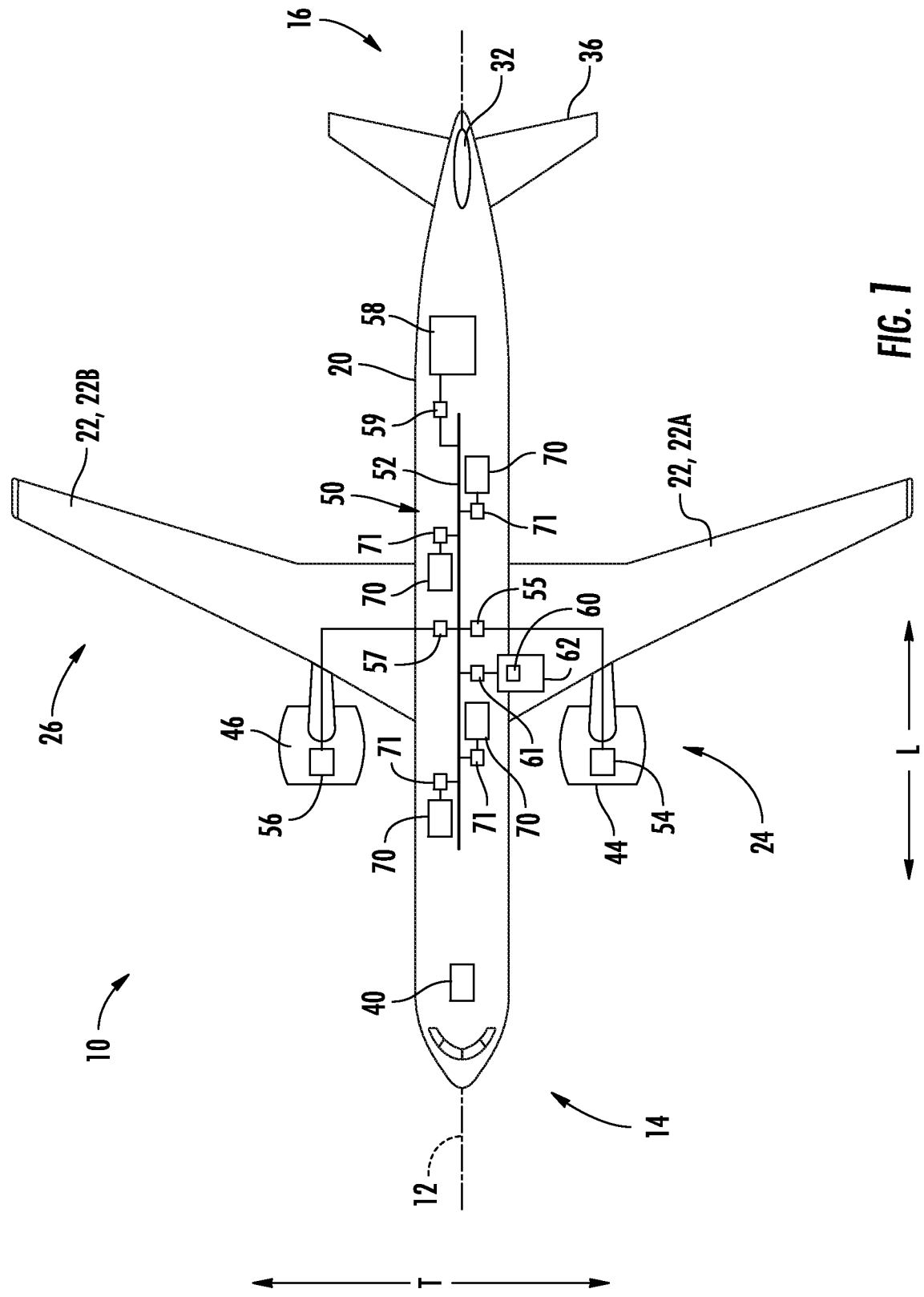
FIG. 1 is a schematic top view of an aircraft in accordance with an example embodiment of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The singular forms "a", "an", and "the" include plural references unless the context clearly dictates otherwise.

The terms "upstream" and "downstream" refer to the relative direction with respect to fluid flow in a fluid pathway. For example, "upstream" refers to the direction from which the fluid flows, and "downstream" refers to the direction to which the fluid flows.

The present disclosure relates to electrical power systems for vehicles, such as aircraft. Such electrical power systems can include power sources that provide electrical power to one or more power consumers. Conventionally, centralized power allocation systems have been implemented to allocate the power output from each power source to meet the power demand of the power consumers. Such conventional power allocation systems typically employ a supervisor controller that determines the load share that each power source is responsible to output in order to meet the power demand. Such conventional centralized systems may have certain drawbacks. For instance, the supervisor controller may act as a single point of failure, robust communication networks are typically needed, and scaling the electrical power system with a greater number of power sources and/or power consumers can be challenging.

Accordingly, in accordance with the inventive aspects of the present disclosure, various embodiments of decentralized electrical power allocation systems are provided. The decentralized electrical power allocation systems provided herein address the drawbacks of conventional centralized power allocation systems and offer collaborative and adaptive control of the power outputs of the power sources to meet a power demand on a power bus applied by the one or more power consumers. Particularly, the power sources are each controlled by their respective power controllers according to an adaptive droop control scheme that leverages an efficiency of the power sources to generate electrical power for a given power output. Each power controller executes adaptive droop control logic in which power feedback associated with a given power source is correlated to a droop function to ultimately determine the power output or load share of the given power source to meet the power demand. The adaptive droop control scheme implemented by the decentralized electrical power system is collaborative in that the droop functions are predefined to optimize the efficiency of the power sources to meet the power demand. The adaptive droop control scheme is adaptive in that the droop functions can be selected from a plurality of droop functions based on, e.g., operating conditions of the vehicle, the health or degradation of components of the electrical power system and/or vehicle generally, etc. In this regard, the droop functions can be selected for correlation purposes based on the unique operating conditions or health status associated with the vehicle or components thereof.

In one example aspect, a decentralized power allocation system for an aircraft is provided. The decentralized power allocation system includes a power bus, such as a direct current power bus (DC power bus) or an alternating current power bus (AC power bus). The decentralized power allocation system also includes one or more electric power consumers electrically coupled with the power bus. Further, the decentralized power allocation system includes at least two power source assemblies, including a first power source assembly and a second power source assembly. The first power source assembly has a fuel cell electrically coupled with the power bus and a first power controller having first power electronics and one or more processors configured to execute adaptive droop control logic so as to cause the first power electronics to control a power output of the fuel cell based at least in part on a first droop function that represents an efficiency of the fuel cell to generate electrical power for a given power output of the fuel cell. The second power source assembly has an electric machine electrically coupled with the power bus. The electric machine is mechanically coupled with a gas turbine engine, such as a turbofan engine. The second power source assembly also includes a second power controller having second power electronics and one or more processors configured to execute adaptive droop control logic so as to cause the second power electronics to control a power output of the electric machine based at least in part on a second droop function that represents an efficiency of the electric machine to generate electrical power for a given power output of the electric machine.

The first droop function and the second droop function are collaboratively defined such that they intersect at a point corresponding to a reference power level and are coordinated so that the power output of the fuel cell is greater than the power output of the electric machine at power levels less than the reference power level and so that the power output of the electric machine is greater than the power output of the fuel cell at power levels greater than the reference power level. Accordingly, when relatively low power is needed, such as during ground idle or taxi operations of an aircraft, the adaptive droop control scheme allows for the fuel cell to handle all or a majority of relatively low power demand on the power bus. This takes advantage of the physics and characteristics of the fuel cell to operate at high efficiency at low power levels whilst also saving fuel and wear on the electric machine and gas turbine engine to which the electric machine is coupled. Moreover, when relatively high power is needed, such as during flight operations of an aircraft, the adaptive droop control scheme allows for the electric machine mechanically coupled with the gas turbine engine to handle a majority of the relatively high power demand on the power bus. This takes advantage of the physics and characteristics of the electric machine to operate at high efficiency at high power levels whilst also using the fuel cell in part to meet the power demand on the power bus.

Referring now to the drawings, wherein identical numerals indicate the same elements throughout the figures, FIG. 1 provides a schematic top view of an aircraft 10 as may incorporate various embodiments of the present disclosure. As shown in FIG. 1, the aircraft 10 defines a longitudinal direction L and a transverse direction T. The aircraft 10 also defines a longitudinal centerline 12 that extends therethrough along the longitudinal direction L. The aircraft 10 extends between a forward end 14 and an aft end 16 along the longitudinal direction L.

In addition, the aircraft 10 includes a fuselage 20 and a pair of wings 22, including a first wing 22A and a second wing 22B. The first wing 22A extends outward from the fuselage 20 generally along the transverse direction T, from a port side 24 of the fuselage 20. The second wing 22B similarly extends outward from the fuselage 20 generally along the transverse direction T from a starboard side 26 of the fuselage 20. The aircraft 10 further includes a vertical stabilizer 32 and a pair of horizontal stabilizers 36. The fuselage 20, wings 22, and stabilizers 32, 36 may together be referred to as a body of the aircraft 10.

The aircraft 10 of FIG. 1 also includes a propulsion system. The propulsion system depicted includes a plurality of aircraft engines, at least one of which is mounted to each of the pair of wings 22A, 22B. Specifically, the plurality of aircraft engines includes a first aircraft engine 44 mounted to the first wing 22A and a second aircraft engine 46 mounted to the second wing 22B. In at least certain embodiments, the aircraft engines 44, 46 may be configured as turbofan engines suspended beneath the wings 22A, 22B in an under-wing configuration. Alternatively, in other example embodiments, the aircraft engines 44, 46 may be mounted in other locations, such as to the fuselage 20 aft of the wings 22. In yet other embodiments, the first and/or second aircraft engines 44, 46 may alternatively be configured as turbojet engines, turboshaft engines, turboprop engines, etc. Further, in other embodiments, the aircraft 10 can have less or more than two aircraft engines. The aircraft 10 can include one or more upper level computing devices 40 communicatively coupled with engine controllers of the first and second aircraft engines 44, 46 so as to command a thrust output of the first and second aircraft engines 44, 46. The upper level computing devices 40 may receive various sensor inputs that may indicate the operating conditions associated with the aircraft 10, such as the flight phase, altitude, attitude, weather conditions, weight of the aircraft 10, etc. The upper level computing devices 40 can be communicatively coupled via a communication network with various processing devices onboard the aircraft 10, such as processors associated with power controllers.

As further shown in FIG. 1, the aircraft 10 includes an electrical power system 50. For this embodiment, the electrical power system 50 includes a power bus 52 to which a plurality of electric power sources and a plurality of electric power consumers are electrically coupled. Particularly, for the depicted embodiment of FIG. 1, the electrical power system 50 includes a first electric machine 54 mechanically coupled with the first aircraft engine 44 (e.g., to a shaft thereof), a second electric machine 56 mechanically coupled with the second aircraft engine 46 (e.g., to a shaft thereof), and an electric energy storage system 58 having one or more batteries, capacitors, etc.

Figure 2:
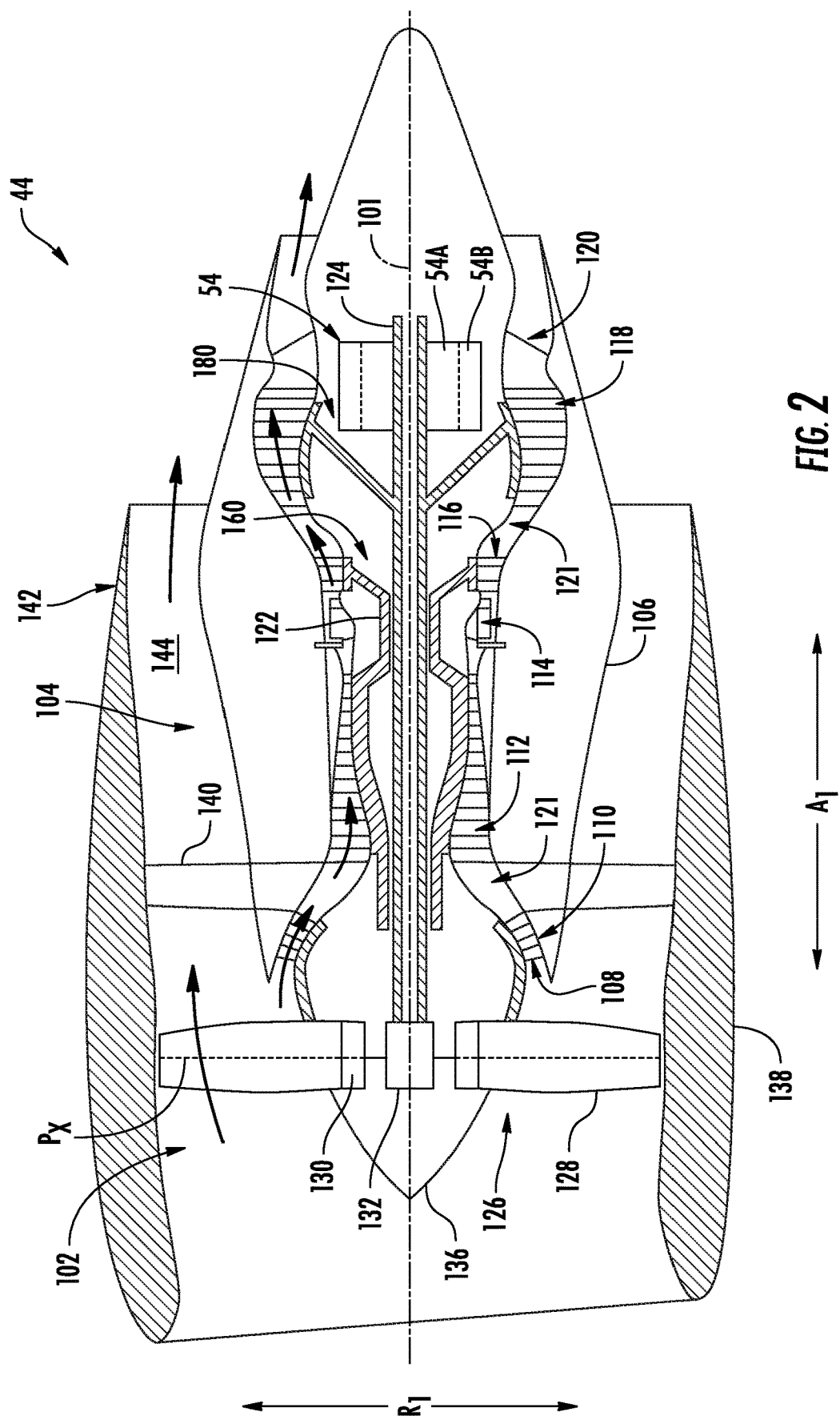
FIG. 2 is a schematic, cross-sectional view of a gas turbine engine of the aircraft of FIG. 1.

FIG. 2 provides a schematic, cross-sectional view of the first aircraft engine 44 and depicts the first electric machine 54 mechanically coupled thereto. As shown in FIG. 2, the first aircraft engine 44 defines an axial direction A1 (extending parallel to a longitudinal centerline 101 provided for reference), a radial direction R1, and a circumferential direction (extending about the axial direction A1; not depicted in FIG. 2). The first aircraft engine 44 includes a fan section 102 and a core turbine engine 104 disposed downstream of the fan section 102.

The core turbine engine 104 includes an engine cowl 106 that defines an annular core inlet 108. The engine cowl 106 encases, in a serial flow relationship, a compressor section including a booster or low pressure (LP) compressor 110 and a high pressure (HP) compressor 112; a combustion section 114; a turbine section including a high pressure (HP) turbine 116 and a low pressure (LP) turbine 118; and a jet exhaust nozzle section 120. The compressor section, combustion section 114, turbine section, and jet exhaust nozzle section 120 together define a core air flowpath 121 extending from the annular core inlet 108 through the LP compressor 110, HP compressor 112, combustion section 114, HP turbine 116, LP turbine 118, and jet exhaust nozzle section 120. A high pressure (HP) shaft 122 drivingly connects the HP turbine 116 to the HP compressor 112. The HP shaft 122 and rotating components of the HP compressor 112 and the HP turbine 116 that are mechanically coupled with the HP shaft 122 collectively form a high pressure spool 160. A low pressure (LP) shaft 124 drivingly connects the LP turbine 118 to the LP compressor 110. The LP shaft 124 and rotating components of the LP compressor 110 and the LP turbine 118 that are mechanically coupled with the LP shaft 124 collectively form a low pressure spool 180.

The fan section 102 may include a fixed or variable pitch fan 126 having a plurality of fan blades 128 coupled to a disk 130 in a spaced apart manner. As depicted, the fan blades 128 extend outward from the disk 130 generally along the radial direction R1. For the variable pitch fan 126 of FIG. 2, each fan blade 128 is rotatable relative to the disk 130 about a pitch axis $P_X$ by virtue of the fan blades 128 being mechanically coupled to an actuation member 132 configured to collectively vary the pitch of the fan blades 128 in unison. The fan blades 128, disk 130, and actuation member 132 are together rotatable about the longitudinal centerline 12 by the LP spool 180. As noted above, in some embodiments, the fan blades 128 may be fixed and not rotatable about their respective pitch axes. Further, in other embodiments, the LP spool 180 may be mechanically coupled with the fan 126 via a gearbox.

Referring still to FIG. 2, the disk 130 is covered by a spinner or rotatable front hub 136 aerodynamically contoured to promote an airflow through the plurality of fan blades 128. Additionally, the fan section 102 includes an outer nacelle 138 that circumferentially surrounds the fan 126 and/or at least a portion of the core turbine engine 104. The nacelle 138 is supported relative to the core turbine engine 104 by a plurality of circumferentially-spaced outlet guide vanes 140. A downstream section 142 of the nacelle 138 extends over an outer portion of the core turbine engine 104 so as to define a bypass passage 144 therebetween.

In addition, for this embodiment, the first electric machine 54 is mechanically coupled with the LP spool 180. Particularly, the first electric machine 54 is directly mechanically coupled to the LP shaft 124. In other embodiments, the first electric machine 54 can be indirectly mechanically coupled to the LP shaft 124, e.g., via a gearbox. In yet other embodiments, the first electric machine 54 can be directly or indirectly mechanically coupled to the HP spool 160, such as directly to the HP shaft 122 or indirectly with the HP shaft 122 by way of a gearbox. In further embodiments, where the first aircraft engine 44 has a low pressure spool, an intermediary pressure spool, and a high pressure spool, the first electric machine 54 can be directly or indirectly mechanically coupled to the intermediary spool, such as directly or indirectly to an intermediary shaft of the intermediary spool.

The first electric machine 54 includes a rotor 54A and a stator 54B. The rotor 54A is rotatable with the LP shaft 124. The stator 54B includes electric current-carrying elements, such as windings or coils. In this manner, electrical power can be transmitted to or from the electric current-carrying elements, and as will be appreciated, electrical energy can be converted into mechanical energy in a motoring mode or mechanical energy can be converted into electrical energy in a generating mode as the rotor 54A rotates relative to the stator 54B. The rotor 54A has rotor components for creating a rotor magnetic field in order to couple to the stator magnetic field to enable energy conversion. The rotor components of the rotor 54A can be, without limitation, rotor magnets in case of a permanent magnet synchronous machine, a squirrel cage in case of an induction machine, or a field winding in case of a field wound synchronous machine.

It should also be appreciated that the first aircraft engine 44 depicted in FIG. 2 and the first electric machine 54 mechanically coupled thereto are provided for example purposes and are not intended to be limiting. In other embodiments, the first aircraft engine 44 may have other configurations. For example, in other embodiments, the first aircraft engine 44 may be configured as a turboprop engine, a turbojet engine, a differently configured turbofan engine, or an unducted turbofan engine (e.g., without the nacelle 138, but including the stationary outlet guide vanes 140). For example, the gas turbine engine may be a geared gas turbine engine (e.g., having a reduction gearbox between the LP shaft 124 and fan 126), may have any other suitable number or configuration of shafts/spools (e.g., may include an intermediate speed shaft/turbine/compressor), etc. Furthermore, it will be appreciated that the second electric machine 56 can be configured and mechanically coupled with the second aircraft engine 46 (FIG. 1) in a same or similar manner as the first electric machine 54 is configured and mechanically coupled with the first aircraft engine 44.

Returning now to FIG. 1, the first electric machine 54, the second electric machine 56, and the electric energy storage system 58 can each act as electric power sources, or in some instances, as electric power consumers. For example, in some instance, the first electric machine 54 and/or the second electric machine 56 can be electric generators configured to be driven by their respective first and second aircraft engines 44, 46 to generate electric power that can be supplied to one or more electric power consumers. In other instances, the first electric machine 54 and/or the second electric machine 56 can be electric motors configured to drive their respective aircraft engines 44, 46, e.g., in a power assist operation. Accordingly, in such instances, the propulsion system can be a hybrid-electric propulsion system. In some embodiments, the first and/or second electric machines 54, 56 can be combination motor/generators controllable in a generator mode or motor mode. The electric energy storage system 58 can be controlled to either provide electric power to one or more electric power consumers or draw electric power, e.g., for charging. The electrical power system 50 also includes a plurality of electric loads 70 that consume but do not produce electric power, such as an aircraft air conditioning system, avionics computing devices, aircraft control systems, cabin lights, etc.

As further depicted in FIG. 1, the electrical power system 50 also includes a fuel cell assembly 60 that is a component of an environmental control system assembly 62 (or "ECS assembly 62"). The fuel cell assembly 60 can provide electrical power to the plurality of electric loads 70 and/or to the first electric machine 54, the second electric machine 56, and/or to the electric energy storage system 58 depending on their configurations or mode of operation. The ECS assembly 62 is located generally at a juncture between the first wing 22A and the fuselage 20. However, in other exemplary embodiments, the ECS assembly 62 may additionally or alternatively be located at other locations within the aircraft 10, such as at a juncture between the second wing 22B and the fuselage 20, at the aft end 16 of the aircraft 10, etc. In some embodiments, the ECS assembly 62 can include more than one fuel cell assembly, such as two fuel cell assemblies.

Figure 3:
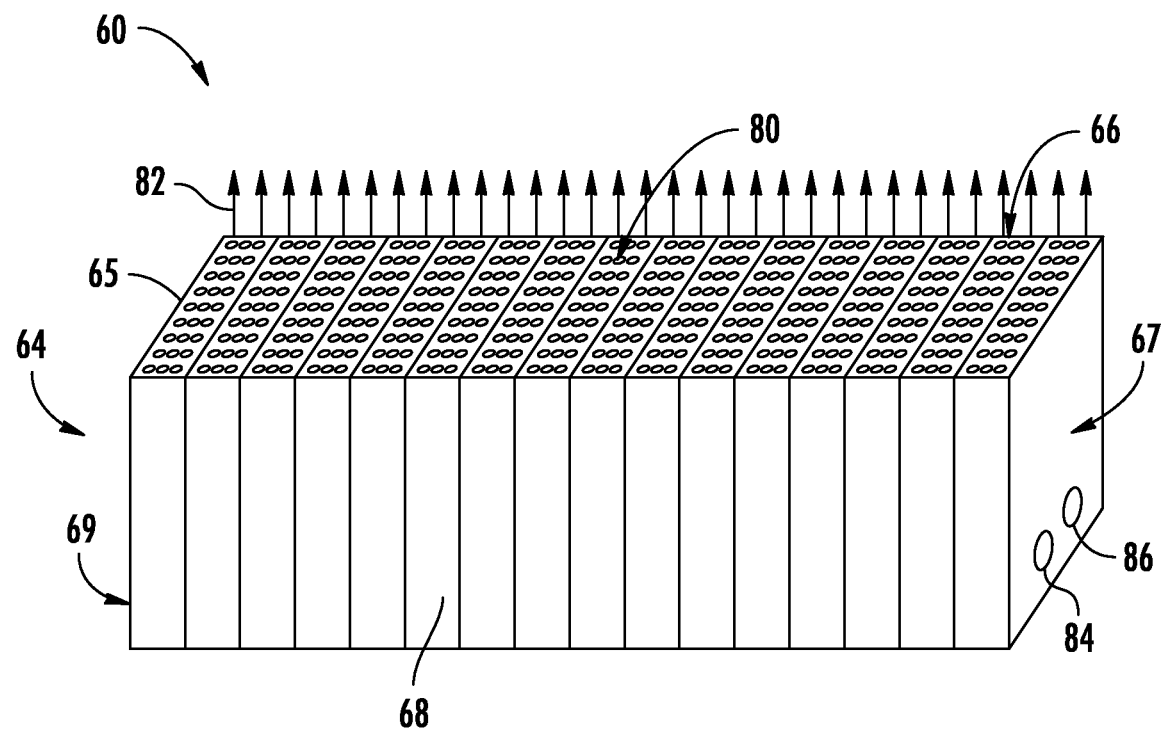
FIG. 3 provides a schematic perspective view of a fuel cell assembly of the aircraft of FIG. 1.

FIG. 3 provides a schematic perspective view of the fuel cell assembly 60 of FIG. 1. The fuel cell assembly 60 includes a fuel cell stack 64. The fuel cell stack 64 includes a housing 65 having an outlet side 66 and a side that is opposite to the outlet side 66, a fuel and air inlet side 67 and a side that is opposite to the fuel and air inlet side 67. The fuel cell stack 64 can include a plurality of fuel cells 68 that are "stacked," e.g., side-by-side from one end of the fuel cell stack 64 (e.g., fuel and air inlet side 67) to another end of the fuel cell stack 64 (e.g., side 69). As such, the outlet side 66 includes a plurality of outlets 80, each from a respective fuel cell 68 of the fuel cell stack 64. During operation, output products 82 are directed from the outlets 80 out of the housing 65. In some embodiments, the outlets 80 can include separate fuel outlets (which may be in fluid communication with, e.g., a fuel exhaust line) and air outlets (which may be in fluid communication with e.g., a fuel cell outlet line of a cabin exhaust delivery system). The fuel and air inlet side 67 includes one or more fuel inlets 84 and one or more air inlets 86. Optionally, one or more of the inlets 84, 86 can be on another side of the housing 65. Each of the one or more fuel inlets 84 can be fluidly coupled with, e.g., a fuel delivery line of a fuel delivery system. Each of the one or more air inlets 86 can be fluidly coupled with, e.g., a fuel cell inlet line of an air delivery system.

Figure 4:
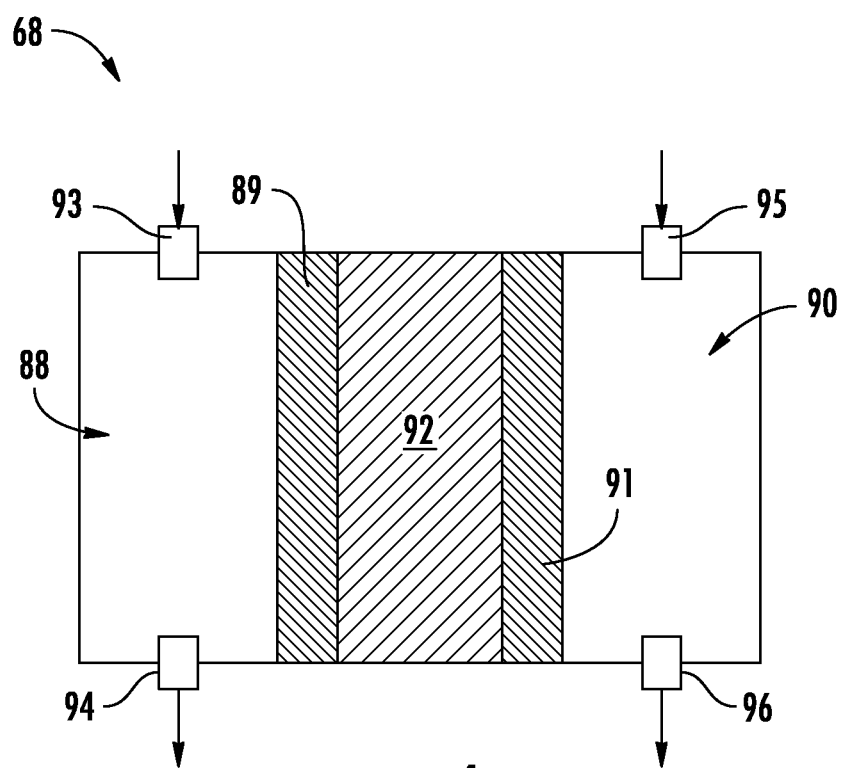
FIG. 4 provides a close-up, schematic view of one fuel cell of the fuel cell assembly of FIG. 3.

FIG. 4 provides a close-up, schematic view of one fuel cell 68 of the fuel cell stack 64 of FIG. 3. The fuel cells 68 of the fuel cell assembly 60 are electro-chemical devices that may convert chemical energy from a fuel into electrical energy through an electro-chemical reaction of the fuel, such as hydrogen, with an oxidizer, such as oxygen contained in the atmospheric air. Accordingly, the fuel cell assembly 60 can advantageously be utilized as a power source. The example fuel cell 68 depicted in FIG. 4, and each of the fuel cells 68 of the fuel cell stack 64 of FIG. 3, are configured as proton exchange membrane fuel cells ("PEM fuel cells"), also known as a polymer electrolyte membrane fuel cell. PEM fuel cells have an operating temperature range and operating temperature pressure determined to work well with the conditions associated with aircraft and other vehicles.

As depicted schematically in FIG. 4, the fuel cell 68 includes a cathode side 88, an anode side 90, and an electrolyte layer 92 positioned between the cathode side 88 and the anode side 90. The cathode side 88 can include a cathode 89 and the anode side 90 can include an anode 91. Further, the cathode side 88 includes a cathode inlet 93 and a cathode outlet 94 and the anode side 90 includes an anode inlet 95 and an anode outlet 96. The cathode side 88 of the fuel cell 68, and more specifically, the cathode inlet 93 of the cathode side 88, can be in fluid communication with, e.g., a cabin exhaust delivery system, and more specifically, a fuel cell inlet line of the cabin exhaust delivery system. The cathode outlet 94 is in fluid communication with a fuel cell outlet line of the cabin exhaust delivery system. Similarly, the anode side 90 of the fuel cell 68, and more specifically, the anode inlet 95 of the anode side 90, is in fluid communication with, e.g., a fuel delivery line of a fuel delivery system. The anode outlet 96 is in fluid communication with e.g., a fuel exhaust line of the fuel delivery system. Accordingly, air may pass through the cathode side 88 and fuel may pass through the anode side 90.

Returning to FIG. 1, the electrical power system 50 includes a plurality of power controllers. Each power controller can include one or more processors and one or more non-transitory memory devices, e.g., embodied in a controller, and power electronics to convert electrical power, e.g., from alternating current (AC) to direct current (DC) or vice versa, or to condition the electrical power to a desired voltage, current, or both. As depicted in FIG. 1, the first electric machine 54 has an associated power controller 55 that controls the electric power between the first electric machine 54 and the power bus 52. Likewise, the second electric machine 56 has an associated power controller 57 that controls the electric power between the second electric machine 56 and the power bus 52. The electric energy storage system 58 also has an associated power controller 59 that controls the electric power between the electric energy storage system 58 and the power bus 52. In addition, the fuel cell assembly 60 has an associated power controller 61 that controls the electric power between the fuel cell assembly 60 and the power bus 52. Similarly, power controllers 71 can be arranged to control the electric power provided from the power bus 52 to the power consuming one or more electric loads 70.

For this embodiment, the electrical power system 50 is configured as a decentralized power allocation system. That is, the architecture of the electrical power system 50 enables the power controllers to control the electrical power outputs of their respective power sources to meet the power demands of the power consumers collaboratively, adaptively, and without active supervision, e.g., from a supervisor controller. Decentralized control of electric power transmission from power sources to one or more power consumers can provide certain advantages, benefits, and technical effects. For instance, the decentralized electrical power allocation systems provided herein may address the drawbacks of conventional centralized power allocation systems and offer collaborative and adaptive control of the power outputs of the power sources to meet a power demand on a power bus applied by the one or more power consumers. In this regard, less computing resources and communication networks may be needed (which has the added benefit of reducing the weight of a vehicle), and localized control can be achieved whilst still being collaborative with other power sources and adaptive to meet to the power demand on the power bus. The inventive aspects of a decentralized power allocation system, which may be incorporated into the electrical power system 50 of the aircraft 10 of FIG. 1 as well as other vehicles, will be provided below in detail.

Figure 5:
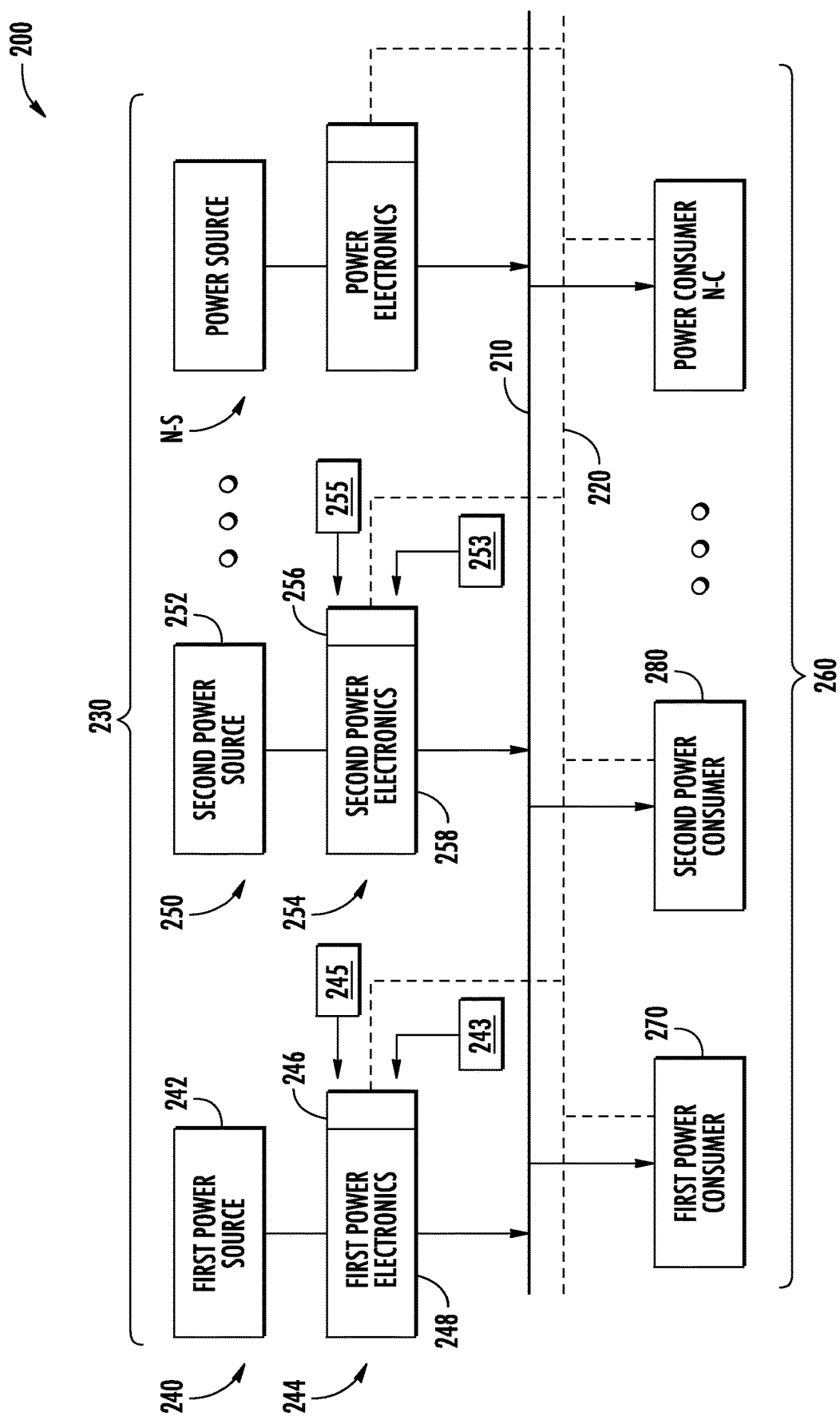
FIG. 5 provides a system diagram of an electrical power system according to an example embodiment of the present disclosure, the electrical power system having a direct current power bus.

FIG. 5 provides a system diagram of an electrical power system 200 according to an example embodiment of the present disclosure. The electrical power system 200 is configured as a decentralized power allocation system in FIG. 5. The electrical power system 200 can be implemented in a vehicle, such as the aircraft 10 of FIG. 1, ships, trains, unmanned aerial vehicles, automobiles, etc.

As depicted in FIG. 5, the electrical power system 200 includes a direct current power bus (or DC power bus 210), a plurality of power source assemblies 230 electrically coupled with the DC power bus 210, and one or more electric power consumers 260 electrically coupled with the DC power bus 210. The electrical power system 200 further includes a communication bus 220 (shown in dashed lines in FIG. 5), which may include one or more wired or wireless communication links. The communication bus 220 enables communication between various components of the electrical power system 200.

For this embodiment, the plurality of power source assemblies 230 include a first power source assembly 240 and a second power source assembly 250. Each power source assembly includes an electric power source and a power controller. For instance, the first power source assembly 240 has a first power source 242 and a first power controller 244. The second power source assembly 250 has a second power source 252 and a second power controller 254. For this example embodiment, the first power source 242 is a fuel cell and the second power source 252 is an electric machine configured as an electric generator or operable in a generator mode. As represented in FIG. 5, the plurality of power source assemblies 230 can include more than two (2) power source assemblies in other example embodiments, or N-S number of power source assemblies, wherein N-S is an integer equal to or greater than two (2).

The first power source 242 and the second power source 252 are electrically coupled with the DC power bus 210. The first power controller 244 controls electric power provided from the first power source 242 to the DC power bus 210. Similarly, the second power controller 254 controls electric power provided from the second power source 252 to the DC power bus 210. The first power controller 244 and the second power controller 254 each include one or more processors and one or more non-transitory memory devices embodied in a first controller 246 and a second controller 256, respectively. The first power controller 244 includes first power electronics 248 to convert or condition electrical power provided from the first power source 242 to the DC power bus 210. The first power electronics 248 can include a plurality of switches controllable in a switching scheme, for example. Similarly, the second power controller 254 includes second power electronics 258 to convert or condition electrical power provided from the second power source 252 to the DC power bus 210. The second power electronics 258 can include a plurality of switches controllable in a switching scheme, for example. The first controller 246 and the second controller 256 are communicatively coupled with one another (and to other components) via the communication bus 220.

The one or more electric power consumers 260 include a first power consumer 270 and a second power consumer 280 in this example embodiment. In some embodiments, the first power consumer 270 can represent one or more mission critical or essential loads and the second power consumer 280 can represent one or more non-essential loads. The one or more electric power consumers 260, or sensors or communication interfaces thereof, can be communicatively coupled with the first controller 246 and the second controller 256 of the first and second power source assemblies 240, 250 via the communication bus 220. As represented in FIG. 5, the one or more electric power consumers 260 can include one or more power consumers, or N–C number of power consumer assemblies, wherein N–C is an integer equal to or greater than one (1).

In addition, for the depicted embodiment of FIG. 5, the first power consumer 270 and the second power consumer 280 are both directly electrically coupled with the DC power bus 210. However, in other embodiments, the first power consumer 270 and/or the second power consumer 280 can be indirectly electrically coupled with the DC power bus 210. For example, an intermediate power bus and/or other power electronics can be positioned electrically between the DC power bus 210 and the first power consumer 270 and/or the second power consumer 280.

The decentralized power allocation control aspects will now be provided with reference to FIGS. 5, 6, and 7. FIG. 6 provides a logic flow diagram for allocating power to be output by the first power source 242 to meet the power demand on the DC power bus 210. FIG. 7 provides a logic flow diagram for allocating power to be output by the second power source 252 to meet the power demand on the DC power bus 210.

As shown particularly in FIG. 6 and with general reference to FIG. 5, the first controller 246 includes adaptive droop control logic 300 in accordance with an adaptive droop control scheme. In executing the adaptive droop control logic 300, the one or more processors of the first controller 246 can regulate the power output of the first power source 242, which as noted above, is a fuel cell in this example embodiment (hence the "FC" designations in FIG. 6).

A power feedback $P_{fbk\text{-}FC}$ is input into a droop control block 304. The power feedback $P_{fbk\text{-}FC}$ can be a measured, calculated, or predicted value indicating the power output of the first power source 242. For instance, one or more sensors can sense the voltage, frequency, and/or the electric current proximate the first power source 242 to measure, calculate, or predict the power output of the first power source 242. At the droop control block 304, the power feedback $P_{fbk\text{-}FC}$ is used for correlation purposes. Particularly, the power feedback $P_{fbk\text{-}FC}$ can be correlated with a first droop function $f_{drp\text{-}FC}$ associated with the first power source 242 to determine a voltage setpoint $v_{REF\text{-}FC}$. The voltage setpoint $v_{REF\text{-}FC}$ can be determined as the y-component of the point along the first droop function $f_{drp\text{-}FC}$ that corresponds with the power feedback $P_{fbk\text{-}FC}$. The first droop function $f_{drp\text{-}FC}$ or curve represents an efficiency of the first power source 242 to generate electrical power for a given power output of the first power source 242.

The first droop function $f_{drp\text{-}FC}$ used for the correlation can be selected from a plurality of first droop functions associated with the first power source 242 as represented in FIG. 6. The first droop function $f_{drp\text{-}FC}$ used for correlation purposes can be selected based at least in part on one or more operating conditions 243 (FIG. 5) associated with the vehicle in which the electrical power system 200 is implemented. For instance, for an aircraft, the first droop function $f_{drp\text{-}FC}$ can be selected based on a phase of flight, an altitude of the aircraft, a number of passengers onboard the aircraft, weather conditions, a combination of the foregoing, etc. These noted operating conditions may each affect the power demand on the DC power bus 210.

As one example, the plurality of first droop functions can include a first droop function for each phase of flight, such as one for takeoff, one for climb, one for cruise, one for descent, and one for approach and landing. As another example, the plurality of first droop functions can include a first droop function for different altitude ranges, such as one for zero (0) to ten thousand (10,000) feet, one for ten thousand one (10,001) to twenty thousand (20,000) feet, and one for twenty thousand one (20,001) feet and above. The altitude ranges can be defined with respect to feet above sea level or above ground level. As yet another example, the plurality of first droop functions can include a first droop function for different ranges of passengers onboard, such as one first droop function for a first range of passengers (e.g., 0 to 50 passengers), one for a second range of passengers (e.g., 51 to 100 passengers), and one for a third range of passengers (e.g., 101 passengers and up). The plurality of first droop functions selectable for correlation purposes can each have different slopes and/or different y-intercepts. The first droop functions or curves each represent an efficiency of the first power source 242 to generate electrical power for a given power output of the first power source 242 at a given set of operating conditions.

As noted above, the selected first droop function $f_{drp-FC}$ can be used to schedule or determine the voltage setpoint $v_{REF-FC}$ associated with the first power source 242. More specifically, the voltage setpoint $v_{REF-FC}$ can be determined as the y-component of the point along the first droop function $f_{drp-FC}$ that corresponds with the power feedback $P_{fbk-FC}$. In this regard, the voltage setpoint $v_{REF-FC}$ is set as a function of the power feedback $P_{fbk-FC}$. The y-intercept of the first droop function $f_{drp-FC}$ selected for correlation purposes in FIG. 6 is denoted as $v_{SET-FC}$.

As further shown in FIG. 6, the determined voltage setpoint $v_{REF-FC}$ is output from the droop control block 304 and forwarded to a voltage loop of the adaptive droop control logic 300. Particularly, the voltage setpoint $v_{REF-FC}$ is input into a first summation block 306 and compared to a voltage feedback $v_{fbk-FC}$. The voltage feedback $v_{fbk-FC}$ can be a measured, calculated, or predicted value indicating the voltage at the first power source 242, e.g., at output terminals thereof. A voltage difference $v_{\Delta-FC}$ is determined at the first summation block 306, e.g., by subtracting the voltage setpoint $v_{REF-FC}$ from the voltage feedback $v_{fbk-FC}$ or vice versa. The voltage difference $v_{\Delta-FC}$ is then input into a proportional-integral control 308, which generates one or more outputs that can be input into a switching logic control 310 that controls modulation of switching devices of the first power electronics 248, e.g., in a Pulse Width Modulated (PWM) switching scheme. Accordingly, a power output 312 of the first power source 242 is achieved. The power output 312 is affected by a disturbance, which is a power demand 212 on the DC power bus 210, as represented at a second summation block 314.

As shown particularly in FIG. 7 and with general reference to FIG. 5, the second controller 256 includes adaptive droop control logic 400 in accordance with the adaptive droop control scheme. In executing the adaptive droop control logic 400, the one or more processors of the second controller 256 can regulate the power output of the second power source 252, which as noted above, is an electric generator or electric machine operable in a generator mode in this example embodiment (hence the GEN" designations in FIG. 7).

A power feedback $P_{fbk-GEN}$ is input into a droop control block 304. The power feedback $P_{fbk-GEN}$ can be a measured, calculated, or predicted value indicating the power output of the second power source 252. For instance, one or more sensors can sense the voltage, frequency, and/or the electric current proximate the second power source 252 to measure, calculate, or predict the power output of the second power source 252. At the droop control block 404, the power feedback $P_{fbk-GEN}$ is used for correlation purposes. Particularly, the power feedback $P_{fbk-GEN}$ can be correlated with a second droop function $f_{drp-GEN}$ associated with the second power source 252 to determine a voltage setpoint $v_{REF-GEN}$. The voltage setpoint $v_{REF-GEN}$ can be determined as the y-component of the point along the second droop function $f_{drp-GEN}$ that corresponds with the power feedback $P_{fbk-GEN}$. The second droop function $f_{drp-GEN}$ or curve represents an efficiency of the second power source 252 to generate electrical power for a given power output of the second power source 252.

The second droop function $f_{drp-GEN}$ used for the correlation can be selected from a plurality of second droop functions associated with the second power source 252 as represented in FIG. 7. The second droop function $f_{drp-GEN}$ used for correlation purposes can be selected based at least in part on one or more operating conditions 253 (FIG. 5) associated with the vehicle in which the electrical power system 200 is implemented. For instance, for an aircraft, the second droop function $f_{drp-GEN}$ can be selected based on a phase of flight, an altitude of the aircraft, a number of passengers onboard the aircraft, weather conditions, a combination of the foregoing, etc. These noted operating conditions may each affect the power demand on the DC power bus 210. The one or more operating conditions 253 received by the second controller 256 of FIG. 5 can be the same as the one or more operating conditions 243 received by the first controller 246 of FIG. 5. The plurality of second droop functions selectable for correlation purposes can each have different slopes and/or different y-intercepts. The second droop functions or curves each represent an efficiency of the second power source 252 to generate electrical power for a given power output of the second power source 252 at a given set of operating conditions.

As noted previously, the selected first droop function $f_{drp-GEN}$ can be used to schedule or determine the voltage setpoint $v_{REF-GEN}$ associated with the second power source 252. More particularly, the voltage setpoint $v_{REF-GEN}$ can be determined as the y-component of the point along the second droop function $f_{drp-GEN}$ that corresponds with the power feedback $P_{fbk-GEN}$. In this regard, the voltage setpoint $v_{REF-GEN}$ is set as a function of the power feedback $P_{fbk-GEN}$. The y-intercept of the second droop function $f_{drp-GEN}$ selected for correlation purposes in FIG. 7 is denoted as $v_{SET-GEN}$.

The voltage setpoint $v_{REF-GEN}$ is output from the droop control block 404 and forwarded to a voltage loop of the adaptive droop control logic 400. Particularly, the voltage setpoint $v_{REF-GEN}$ is input into a first summation block 406 and compared to a voltage feedback $v_{fbk-GEN}$. The voltage feedback $v_{fbk-GEN}$ can be a measured, calculated, or predicted value indicating the voltage at the second power source 252, e.g., at output terminals thereof. A voltage difference $v_{\Delta-GEN}$ is determined at the first summation block 406, e.g., by subtracting the voltage setpoint $v_{REF-GEN}$ from the voltage feedback V $f$bk-GEN or vice versa. The voltage difference $v_{\Delta-GEN}$ is then input into a proportional-integral control 408, which generates one or more outputs that can be input into a switching logic control 410 that controls modulation of switching devices of the second power electronics 258, e.g., in a PWM switching scheme. Accordingly, a power output 412 of the second power source 252 is achieved. The power output 412 is affected by a disturbance, which is the power demand 212 on the DC power bus 210, as represented at a second summation block 414.

Accordingly, each power controller of the power source assemblies 230 includes executable adaptive droop control logic, e.g., similar to the adaptive droop control logic 300, 400 depicted in FIGS. 6 and 7. When a given power controller executes its adaptive droop control logic, the one or more processors of the given power controller cause its associated power electronics to control the power output of its associated power source. This adaptive droop control scheme executed by each power controller of the power source assemblies 230 enables intelligent decentralized power allocation for meeting power demands on the DC power bus 210 applied by the electric power consumers 260. Specifically, implementation of the adaptive droop control scheme enables decentralized DC bus regulation according to the efficiencies of the power sources at given power outputs.

Figure 8:
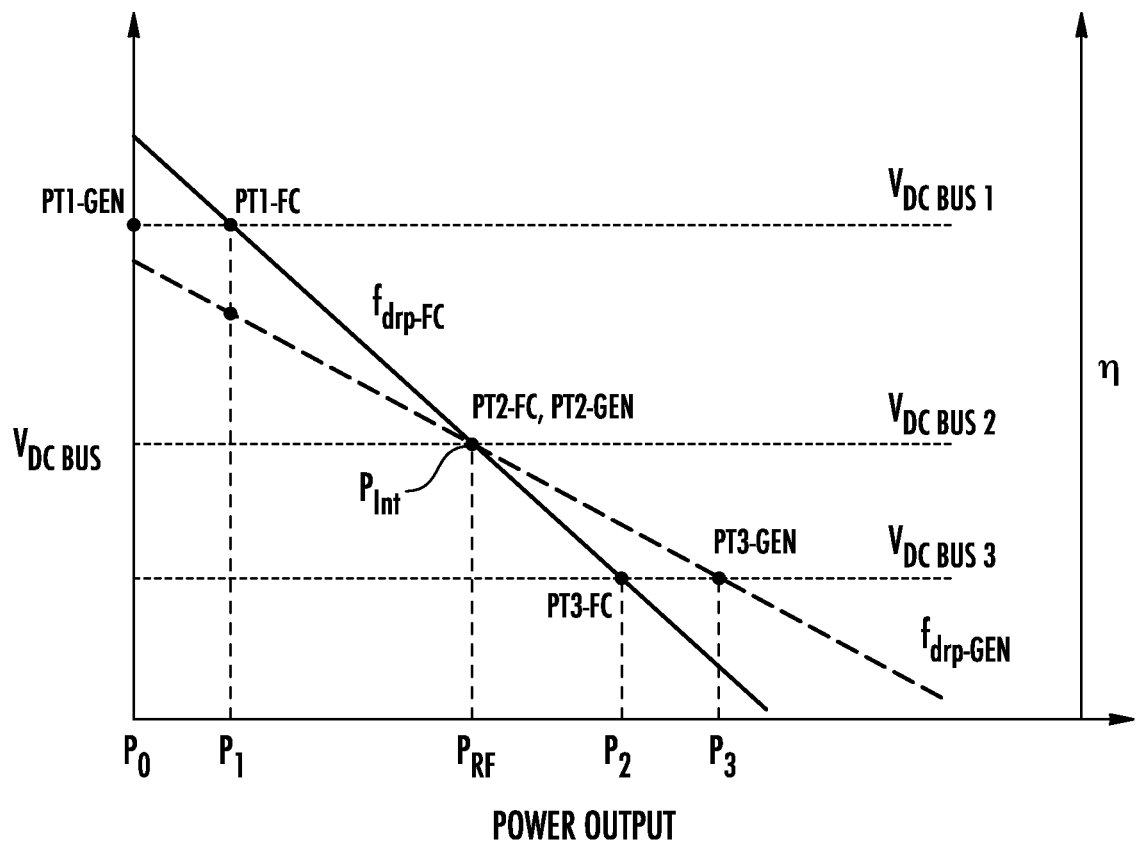
FIG. 8 provides a graph depicting a first droop function associated with the first power source overlaid with a second droop function associated with the second power source of the electrical power system of FIG. 5.

For instance, with reference to FIGS. 5 and 8, FIG. 8 provides a graph representing the first droop function $f_{drp\text{-}FC}$ associated with the first power source 242 overlaid with the second droop function $f_{drp\text{-}GEN}$ associated with the second power source 252 on a DC bus voltage versus power output graph. As noted above, the first droop function $f_{drp\text{-}FC}$ represents an efficiency of the first power source 242 to generate electrical power for a given power output of the first power source 242 and the second droop function $f_{drp\text{-}GEN}$ represents an efficiency of the second power source 252 to generate electrical power for a given power output of the second power source 252. According, the droop functions are also functions of power output efficiency η.

As shown in FIG. 8, the droop functions have different slopes and different y-intercepts, with the first droop function $f_{drp\text{-}FC}$ having a steeper slope than the second droop function $f_{drp\text{-}GEN}$ and the first droop function $f_{drp\text{-}FC}$ having a greater y-intercept than the second droop function $f_{drp\text{-}GEN}$. Also, the droop functions intersect at a point $P_{Int}$ corresponding to a reference power level $P_{RF}$. Accordingly, the first power source 242, or fuel cell for this example, is more efficient at outputting electric power at lower power levels than the second power source 252, or electric machine in this example. In contrast, at higher power levels, the second power source 252 is more efficient at outputting electric power than the first power source 242. In this regard, the droop functions are coordinated so that the power output of the first power source 242, or fuel cell, is greater than the power output of the second power source 252, or electric machine, at power levels less than the reference power level $P_{RF}$ and so that the power output of the second power source 252, or electric machine, is greater than the power output of the first power source 242, or fuel cell, at power levels greater than the reference power level $P_{RF}$.

Particularly, as shown in FIG. 8, for a given DC bus voltage, the working point of both the first power source 242 and the second power source 252 will both be on the same horizontal line as the first and second power sources 242, 252 are electrically coupled to a common power bus, or DC power bus 210 in this example. For instance, for a first DC bus voltage $v_{DC\ BUS\ 1}$, the working point of the first power source 242, or fuel cell, and the working point of the second power source 252, or electric machine, are on the same horizontal line. The working point of the first power source 242 is denoted as PT1-FC and the working point of the second power source 252 is denoted as PT1-GEN. For the first DC bus voltage $v_{DC\ BUS\ 1}$, the first power source 242, or fuel cell, has a power output of P1 while the second power source 252, or electric machine, has a power output of P0.

Accordingly, the first power source 242 has a greater load share or power output at the first DC bus voltage $v_{DC\ BUS\ 1}$ than does the second power source 252. The power output of P0 is equal to zero (0) in this instance, as the y-intercept of the second droop function $f_{drp\text{-}GEN}$ is less than the first DC bus voltage $v_{DC\ BUS\ 1}$. Accordingly, to meet the first DC bus voltage $v_{DC\ BUS\ 1}$, only the first power source 242, or fuel cell, outputs electric power. Thus, the load share split is 100%/0%, with the first power source 242 being at 100% and the second power source 252 at 0%. Advantageously, when relatively low power is needed, such as during ground idle or taxi operations of an aircraft, the adaptive droop control scheme allows for the first power source 242, or fuel cell, to handle all or most of the relatively low power demand on the DC power bus 210. This takes advantage of the physics and characteristics of the fuel cell to operate at high efficiency at low power levels whilst also saving fuel and wear on the electric machine and gas turbine engine to which the electric machine is coupled.

For a second DC bus voltage $v_{DC\ BUS\ 2}$, which corresponds to a lower voltage level than the first DC bus voltage $v_{DC\ BUS\ 1}$, the working point of the first power source 242, or fuel cell, and the working point of the second power source 252, or electric machine, are on the same horizontal line. The working point of the first power source 242 is denoted as PT2-FC and the working point of the second power source 252 is denoted as PT2-GEN. For the second DC bus voltage $v_{DC\ BUS\ 2}$, the first power source 242, or fuel cell, and the second power source 252, or electric machine, both have the same power output, which corresponds to the reference power level $P_{RF}$. Accordingly, the first power source 242 and the second power source 252 have a same load share or power output at the second DC bus voltage $v_{DC\ BUS\ 2}$. Thus, the load share split is 50%/50%, with the first power source 242 being at 50% and the second power source 252 being at 50% to meet the power demand on the DC power bus 210.

Further, for a third DC bus voltage $v_{DC\ BUS\ 3}$, which corresponds to a lower voltage level than the second DC bus voltage $v_{DC\ BUS\ 2}$, the working point of the first power source 242, or fuel cell, and the working point of the second power source 252, or electric machine, are on the same horizontal line. The working point of the first power source 242 is denoted as PT3-FC and the working point of the second power source 252 is denoted as PT3-GEN. For the third DC bus voltage $v_{DC\ BUS\ 3}$, the first power source 242, or fuel cell, has a power output of P2 while the second power source 252, or electric machine, has a power output of P3, which is greater than the power output of P2.

Accordingly, the second power source 252 has a greater load share or power output at the third DC bus voltage $v_{DC\ BUS\ 3}$ than does the first power source 242. The load share split can be 40%/60%, with the first power source 242 being at 40% and the second power source 252 at 60%, for example. Advantageously, when relatively high power is needed, such as during flight operations of an aircraft, the adaptive droop control scheme allows for the second power source 252, or electric machine mechanically coupled with a gas turbine engine, to handle most of the relatively high power demand on the DC power bus 210. This takes advantage of the physics and characteristics of the electric machine to operate at high efficiency at high power levels whilst also using the fuel cell in part to meet the power demand on the DC power bus 210.

Accordingly, the power allocation for the power sources is set according to the characteristics of the droop functions, such as their slopes, y-intercepts, and overall shapes. For the depicted embodiment of FIG. 8, as the droop functions converge toward one another, the load share between the first power source 242 and the second power source 252 becomes more balanced, as represented at the second DC bus voltage $v_{DC\ BUS\ 2}$. Conversely, as the droop functions diverge away from one another, the load share between the first power source 242 and the second power source 252 becomes less balanced, as represented at the first DC bus voltage $v_{DC\ BUS\ 1}$ and the third DC bus voltage $v_{DC\ BUS\ 3}$.

Figure 9:
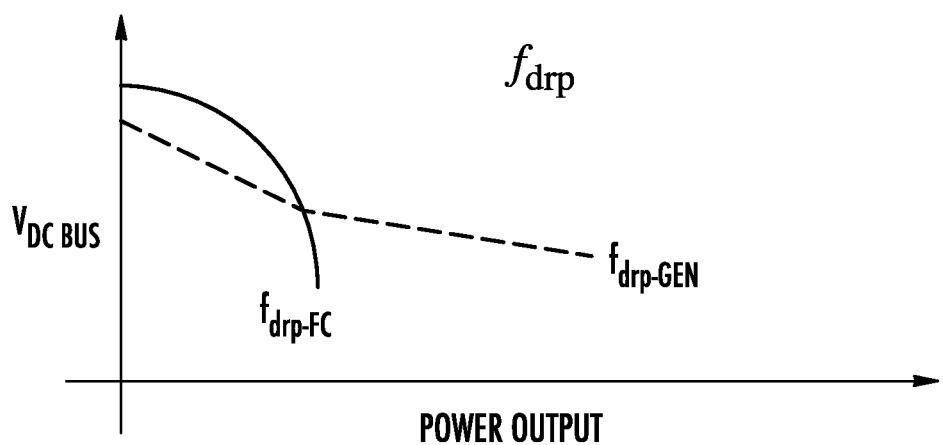
FIG. 9 provides a graph representing a non-linear first droop function associated with the first power source overlaid with the second droop function associated with the second power source on a DC bus voltage versus power output graph.

The droop functions depicted in FIGS. 6, 7, and 8, are linear functions. However, one or more of the droop functions can be non-linear functions in other example embodiments. For instance, FIG. 9 provides a graph representing a non-linear first droop function $f_{drp-FC}$ associated with the first power source 242 overlaid with the second droop function $f_{drp-GEN}$ associated with the second power source 252 on a DC bus voltage versus power output graph. The non-linear first droop function $f_{drp-FC}$ may better represent the efficiency of the first power source 242, or fuel cell, to output electric power at a given power output. Further, the second droop function $f_{drp-GEN}$ may be linear, but may be a piecewise linear function. For this example embodiment, the piecewise linear second droop function $f_{drp-GEN}$ includes a first segment having a first slope and a second segment having a second slope that is different than the first slope. For this example, the first segment is steeper than the second segment of the second droop function $f_{drp-GEN}$. Such a piecewise linear second droop function $f_{drp-GEN}$ having various slopes may better represent the efficiency of the second power source 252, or electric machine, to output electric power at a given power output. The droop functions can have other curves or shapes as well, such as polynomial shapes.

Figure 10:
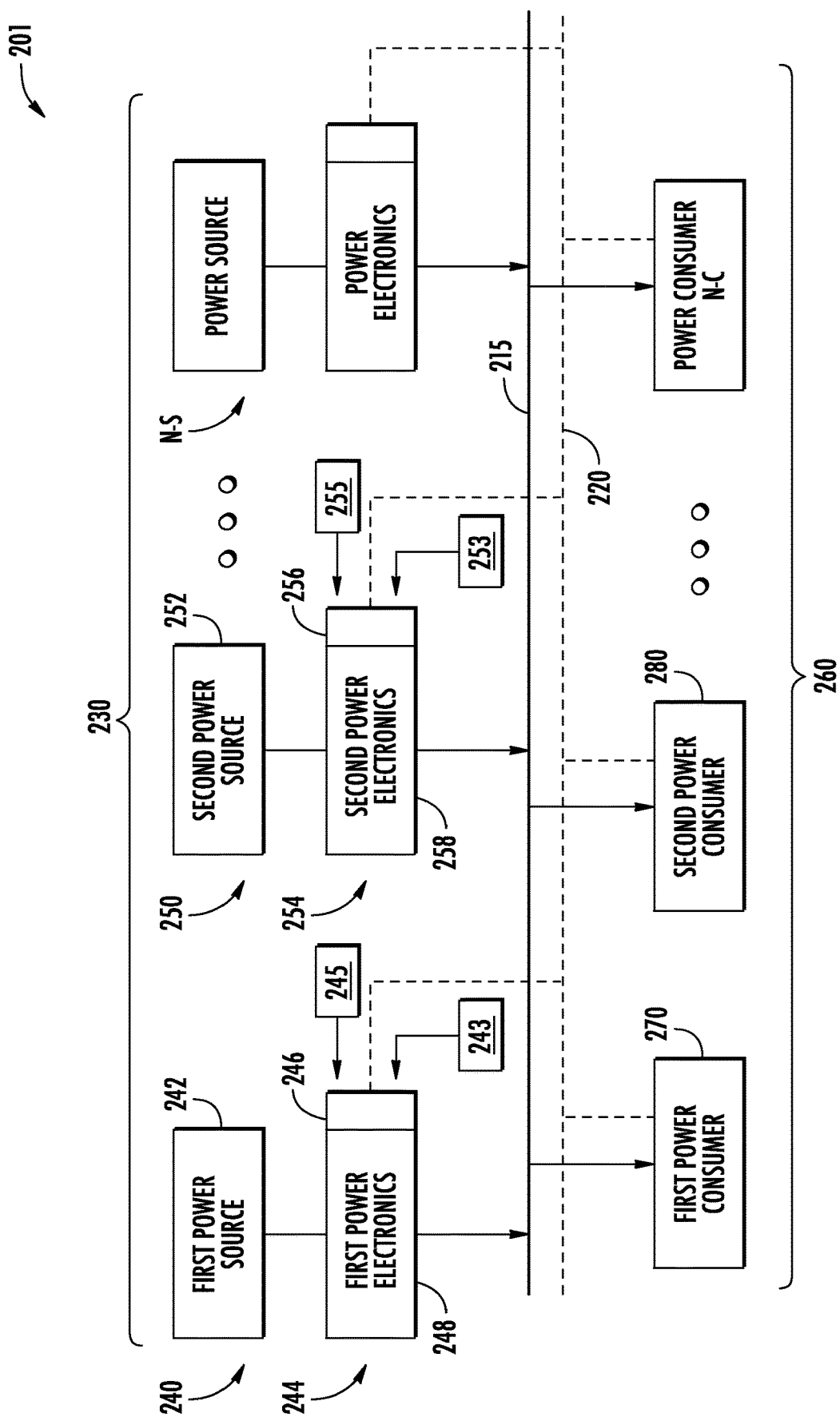
FIG. 10 provides a system diagram of another electrical power system according to an example embodiment of the present disclosure, the electrical power system having an alternating current power bus.

FIG. 10 provides a system diagram of an electrical power system 201 according to another example embodiment of the present disclosure. The electrical power system 201 is configured as a decentralized power allocation system in FIG. 10. The electrical power system 201 of FIG. 10 can be implemented in a vehicle, such as the aircraft 10 of FIG. 1, ships, trains, unmanned aerial vehicles, automobiles, etc. The electrical power system 201 of FIG. 10 is configured in a similar manner as the electrical power system 200 of FIG. 5, and therefore, like parts will be identified with like numerals with it being understood that the description of the like parts of the electrical power system 200 applies to the electrical power system 201 unless otherwise noted. Notably, the electrical power system 201 of FIG. 10 includes an alternating current power bus (or AC power bus 215) to which the plurality of power source assemblies 230 and the one or more electric power consumers 260 are electrically coupled. Single or multiphase power can be transmitted along the AC power bus 215.

In addition, for the depicted embodiment of FIG. 10, the first power consumer 270 and the second power consumer 280 are both directly electrically coupled with the AC power bus 215. However, in other embodiments, the first power consumer 270 and/or the second power consumer 280 can be indirectly electrically coupled with the AC power bus 215. For example, an intermediate power bus and/or other power electronics can be positioned electrically between the AC power bus 215 and the first power consumer 270 and/or the second power consumer 280.

For the electrical power system 201 of FIG. 10 having the AC power bus 215, the adaptive droop control scheme is implemented in a similar manner as described above with reference to the DC power bus 210 of FIG. 5, except as provided below. As will be appreciated, a sinusoidal voltage waveform on an AC power bus has both a frequency and an amplitude. The frequency of a voltage waveform is highly coupled with active power, or power that is utilized and consumed for useful work in electrical systems. The amplitude of a voltage waveform is highly coupled with reactive power, or power that "bounces" back and forth between the power source(s) and power consumer(s) in electrical systems. Accordingly, active power is more sensitive to changes in frequency on the AC power bus 215 while reactive power is more sensitive to changes in amplitude.

Figure 11:
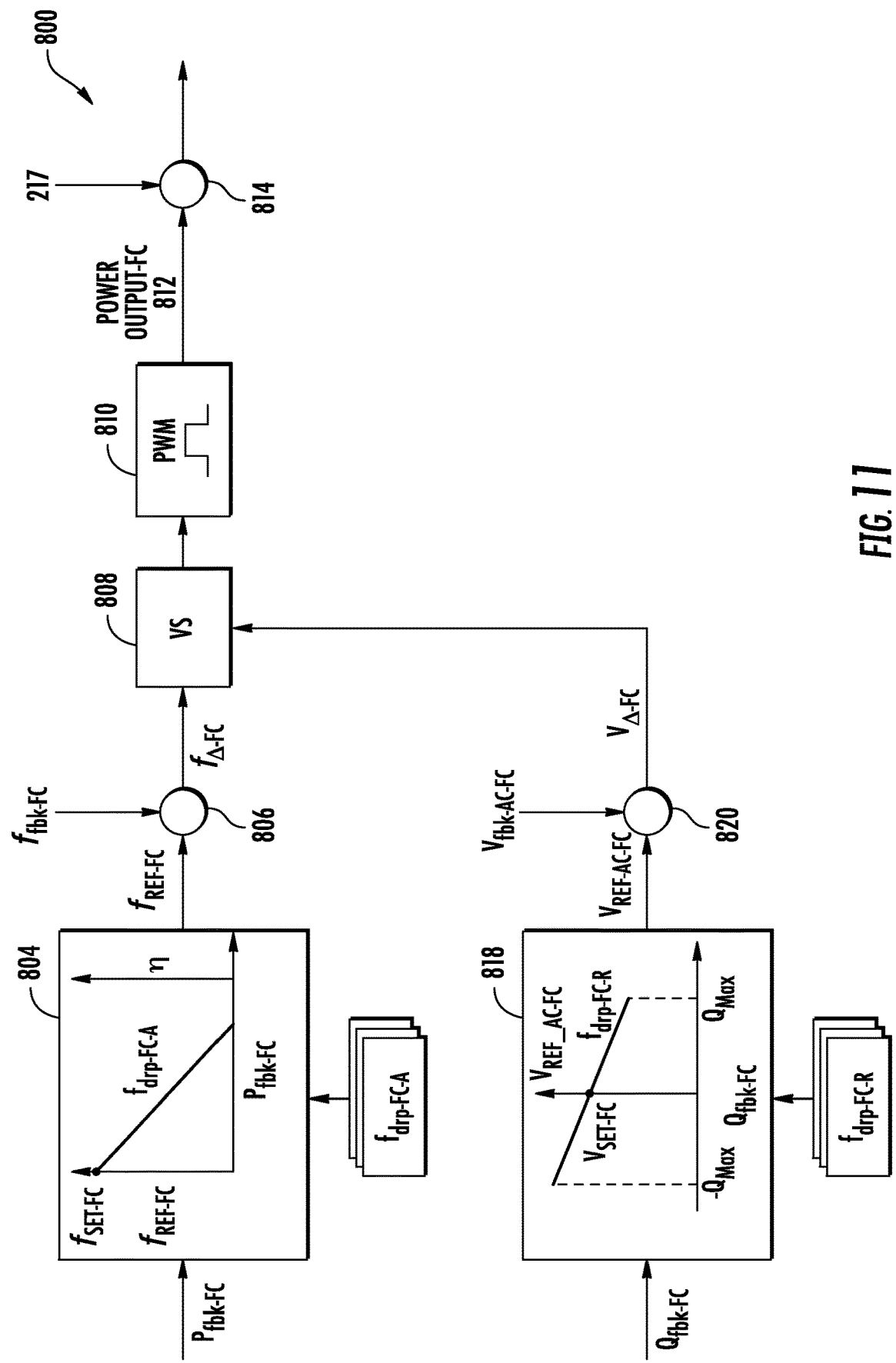
FIG. 11 provides a logic flow diagram for allocating power to be output by a first power source of the electrical power system of FIG. 10.
Figure 12:
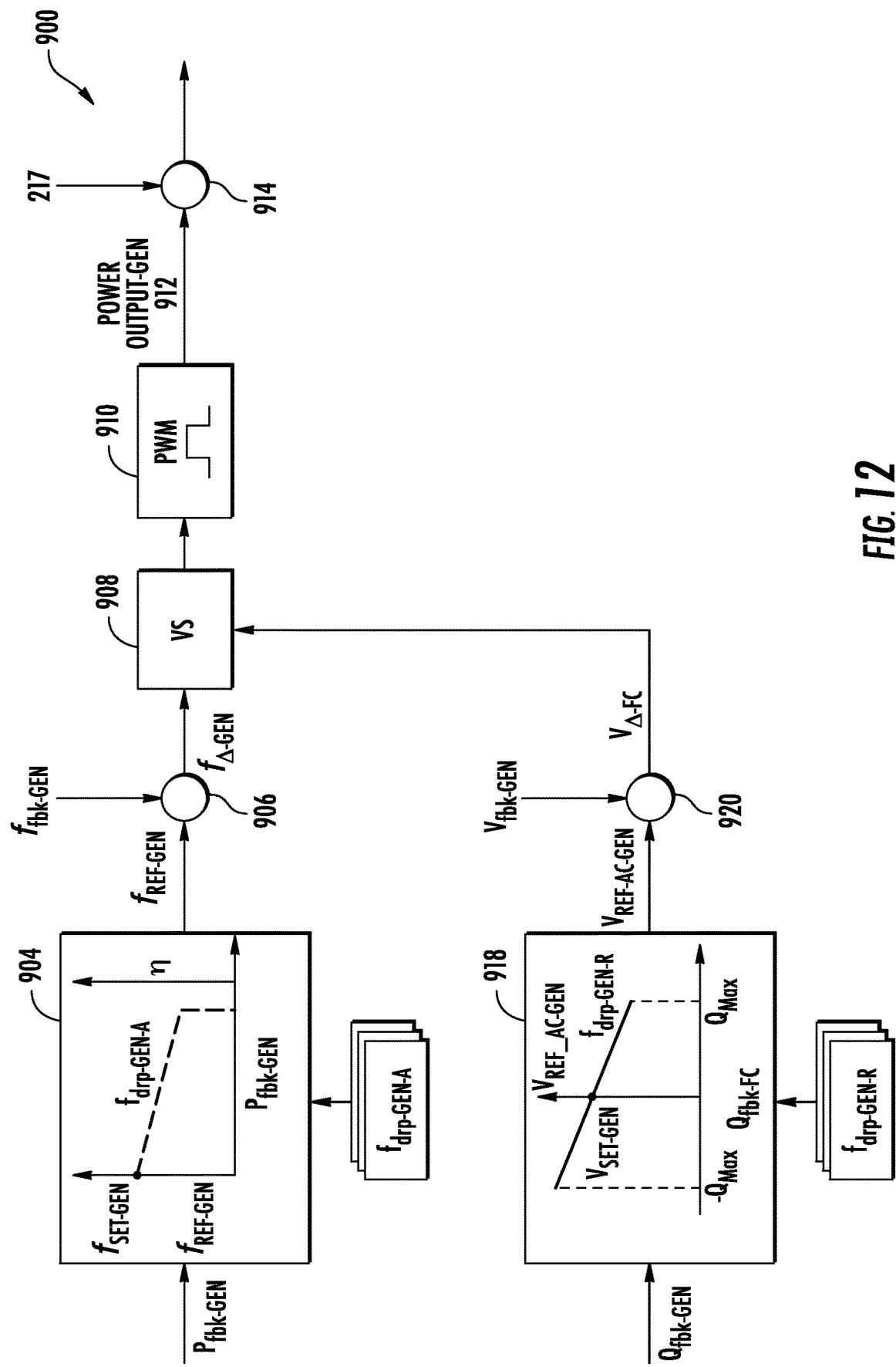
FIG. 12 provides a logic flow diagram for allocating power to be output by a second power source of the electrical power system of FIG. 10.

With these considerations in mind, the decentralized power allocation control aspects will now be provided with reference to FIGS. 10, 11, and 12. FIG. 11 provides a logic flow diagram for allocating power to be output by the first power source 242, or fuel cell, to meet the power demand on the AC power bus 215. FIG. 12 provides a logic flow diagram for allocating power to be output by the second power source 252, or electric machine, to meet the power demand on the AC power bus 215.

As shown particularly in FIG. 11 and with general reference to FIG. 10, the first controller 246 includes adaptive droop control logic 800 in accordance with an adaptive droop control scheme for AC power bus systems. In executing the adaptive droop control logic 800, the one or more processors of the first controller 246 can regulate the power output of the first power source 242, which as noted above, is a fuel cell in this example embodiment (hence the "FC" designations in FIG. 11).

The adaptive droop control logic 800 includes active power droop control. As depicted, a power feedback $P_{fbk-FC}$, which relates to active power, is input into an active power droop control block 804. The power feedback $P_{fbk-FC}$ can be a measured, calculated, or predicted value indicating the active power output of the first power source 242. For instance, one or more sensors can sense the voltage, frequency, and/or the electric current proximate the first power source 242 to measure, calculate, or predict the active power output of the first power source 242. At the active power droop control block 804, the power feedback $P_{fbk-FC}$ is used for correlation purposes. Particularly, the power feedback $P_{fbk-FC}$ can be correlated with a first active droop function $f_{drp-FC-A}$ associated with the first power source 242 to determine a frequency setpoint $f_{REF-FC}$.

The first active droop function $f_{drp-FC-A}$ used for the correlation can be selected from a plurality of first active droop functions associated with the first power source 242. The first active droop function $f_{drp-FC-A}$ can be selected based at least in part on one or more operating conditions 243 (FIG. 10) associated with the vehicle in which the electrical power system 201 is implemented. For instance, for an aircraft, the first active droop function $f_{drp-FC-A}$ can be selected based on a phase of flight, altitude of the aircraft, number of passengers onboard the aircraft, weather conditions, a combination of the foregoing, etc. The first droop functions or curves represent an efficiency of the first power source 242 to generate electrical power for a given power output of the first power source 242 at a given set of operating conditions.

The selected first active droop function $f_{drp-FC-A}$ can be used to schedule or determine the frequency setpoint $f_{REF-FC}$ associated with the first power source 242. More particularly, the frequency setpoint $f_{REF-FC}$ can be determined as the y-component of the point along the first active droop function $f_{drp-FC-A}$ that corresponds with the power feedback $P_{fbk-FC}$. In this regard, the frequency setpoint $f_{REF-FC}$ is set as a function of the power feedback $P_{fbk-FC}$. The y-intercept of the first active droop function $f_{drp-FC-A}$ selected for correlation purposes in FIG. 11 is denoted as $f_{SET-FC}$.

The frequency setpoint $f_{REF-FC}$ is output from the droop control block 804 and input into a first summation block 806 and compared to a frequency feedback $f_{fbk-FC}$. The frequency feedback $f_{fbk-FC}$ can be a measured, calculated, or predicted value indicating the frequency at the first power source 242, e.g., at output terminals thereof. A frequency difference $f_{\Delta-FC}$ is determined at the first summation block 806, e.g., by subtracting the frequency setpoint $f_{REF-FC}$ from the frequency feedback $f_{fbk-FC}$ or vice versa.

As further shown in FIG. 11, for AC power bus systems, the adaptive droop control logic 800 includes reactive power droop control in addition to the active power droop control disclosed above. As illustrated, a power feedback $Q_{fbk-FC}$, which relates to reactive power, is input into a reactive power droop control block 818. The power feedback $Q_{fbk-FC}$ can be a measured, calculated, or predicted value indicating the reactive power at the first power source 242, or rather the power that moves back and forth between the first power source 242 and the one or more electric power consumers 260. For instance, a varmeter can be used to measure, calculate, or predict the reactive power at the first power source 242. At the reactive power droop control block 818, the power feedback $Q_{fbk-FC}$ is used for correlation purposes. Specifically, the power feedback $Q_{fbk-FC}$ can be correlated with a first reactive droop function $f_{drp-FC-R}$ associated with the first power source 242 to determine a voltage amplitude setpoint $v_{REF\_AC-FC}$.

The first reactive droop function $f_{drp-FC-R}$ used for the correlation can be selected from a plurality of first reactive droop functions associated with the first power source 242. The first reactive droop function $f_{drp-FC-R}$ can be selected based at least in part on one or more operating conditions 243 (FIG. 10) associated with the vehicle in which the electrical power system 201 is implemented. For instance, for an aircraft, the first reactive droop function $f_{drp-FC-R}$ can be selected based on a phase of flight, altitude of the aircraft, number of passengers onboard the aircraft, weather conditions, a combination of the foregoing, etc.

The selected first reactive droop function $f_{drp-FC-R}$ can be used to schedule or determine the voltage amplitude setpoint $v_{REF\_AC-FC}$ associated with the first power source 242. More particularly, the voltage amplitude setpoint $v_{REF\_AC-FC}$ can be determined as the y-component of the point along the first reactive droop function $f_{drp-FC}$-R that corresponds with the power feedback $Q_{fbk-FC}$. In this regard, the voltage amplitude setpoint $v_{REF\_AC-FC}$ is set as a function of the power feedback $Q_{fbk-FC}$, which corresponds to reactive power feedback. The y-intercept of the first reactive droop function $f_{drp-FC-R}$ selected for correlation purposes in FIG. 11 is denoted as $v_{SET-FC}$. The power feedback $Q_{fbk-FC}$ is bound by an inductive limit $-Q_{Max}$ and a capacitive limit $Q_{Max}$.

The voltage amplitude setpoint $v_{REF\_AC-FC}$ is output from the reactive power droop control block 818 and input into a second summation block 820. The voltage amplitude setpoint $v_{REF\_AC-FC}$ is compared to a voltage amplitude feedback $f_{fbk\_AC-FC}$ at the second summation block 820. The voltage amplitude feedback $f_{fbk\_AC-FC}$ can be a measured, calculated, or predicted value indicating the voltage amplitude at the first power source 242, e.g., at output terminals thereof. A voltage amplitude difference $v_{\Delta-FC}$ is determined at the second summation block 820, e.g., by subtracting the voltage amplitude setpoint $v_{REF\_AC-FC}$ from the voltage amplitude feedback $ff_{bk\_AC-FC}$ or vice versa.

The frequency difference $f_{\Delta-FC}$ and the voltage amplitude difference $v_{\Delta-FC}$ are input into a voltage synthesizer 808, which generates one or more outputs (e.g., a modulation index) that can be input into a switching logic control 810 that controls modulation of switching devices of the first power electronics 248, e.g., in a PWM switching scheme. Accordingly, a power output 812 of the first power source 242 is achieved. The power output 812 has an active power component and a reactive power component. The power output 812 is affected by a disturbance, which is a power demand 217 on the AC power bus 215, as represented at a third summation block 814.

As shown particularly in FIG. 12 and with general reference to FIG. 10, the second controller 256 includes adaptive droop control logic 900 in accordance with the adaptive droop control scheme. In executing the adaptive droop control logic 900, the one or more processors of the second controller 256 can regulate the power output of the second power source 252, which as noted above, is an electric generator or electric machine operable in a generator mode in this example embodiment (hence the GEN" designations in FIG. 12).

Like the adaptive droop control logic 800 (FIG. 11) associated with the first power source assembly 240, the adaptive droop control logic 900 associated with the second power source assembly 250 includes both active power droop control and reactive droop control. For the active droop control aspect of the adaptive droop control logic 900, a power feedback $P_{fbk-GEN}$, which relates to active power, is input into an active power droop control block 904. The power feedback $P_{fbk-GEN}$ can be a measured, calculated, or predicted value indicating the active power output of the second power source 252. For instance, one or more sensors can sense the voltage, frequency, and/or the electric current proximate the second power source 252 to measure, calculate, or predict the active power output of the second power source 252. At the active power droop control block 904, the power feedback $P_{fbk-GEN}$ is used for correlation purposes. Specifically, the power feedback $P_{fbk-GEN}$ can be correlated with a second active droop function $f_{drp-GEN-A}$ associated with the second power source 252 to determine a frequency setpoint $f_{REF-GEN}$.

The second active droop function $f_{drp-GEN-A}$ used for the correlation can be selected from a plurality of second active droop functions associated with the second power source 252. The second active droop function $f_{drp-GEN-A}$ can be selected based at least in part on one or more operating conditions 253 (FIG. 10) associated with the vehicle in which the electrical power system 201 is implemented. For instance, for an aircraft, the second active droop function $f_{drp-GEN-A}$ can be selected based on a phase of flight, altitude of the aircraft, number of passengers onboard the aircraft, weather conditions, a combination of the foregoing, etc. The second droop functions or curves represent an efficiency of the second power source 252 to generate electrical power for a given power output of the second power source 252. The one or more operating conditions 253 received by the second controller 256 of FIG. 10 can be the same as the one or more operating conditions 243 received by the first controller 246 of FIG. 10.

As noted above, the selected second active droop function $f_{drp-GEN-A}$ can be used to schedule or determine the frequency setpoint $f$REF-GEN associated with the second power source 252. More particularly, the frequency setpoint $f_{REF-GEN}$ can be determined as the y-component of the point along the second active droop function $f_{drp-GEN-A}$ that corresponds with the power feedback $P_{fbk-GEN}$. In this regard, the frequency setpoint $f_{REF-GEN}$ is set as a function of the power feedback $P_{fbk-GEN}$. The y-intercept of the second active droop function $f_{drp-GEN-A}$ selected for correlation purposes in FIG. 12 is denoted as $f_{SET-GEN}$.

The frequency setpoint $f_{REF-GEN}$ is output from the droop control block 904 and input into a first summation block 906 and compared to a frequency feedback $f_{fbk-GEN}$. The frequency feedback $f_{fbk-GEN}$ can be a measured, calculated, or predicted value indicating the frequency at the second power source 252, e.g., at output terminals thereof. A frequency difference $f_{\Delta-GEN}$ is determined at the first summation block 906, e.g., by subtracting the frequency setpoint $f_{REF-GEN}$ from the frequency feedback $f_{fbk-GEN}$ or vice versa.

As noted above, the adaptive droop control logic 900 includes reactive power droop control in addition to the active power droop control disclosed above. As illustrated, a power feedback $Q_{fbk\text{-}GEN}$, which relates to reactive power, is input into a reactive power droop control block 918. The power feedback $Q_{fbk\text{-}GEN}$ can be a measured, calculated, or predicted value indicating the reactive power at the second power source 252, or rather the power that moves back and forth between the second power source 252 and the one or more electric power consumers 260. A varmeter can be used to measure, calculate, or predict the reactive power at the second power source 252. At the reactive power droop control block 918, the power feedback $Q_{fbk\text{-}GEN}$ is used for correlation purposes. Particularly, the power feedback $Q_{fbk\text{-}GEN}$ can be correlated with a second reactive droop function $f_{drp\text{-}GEN\text{-}R}$ associated with the second power source 252 to determine a voltage amplitude setpoint $v_{REF\_AC\text{-}GEN}$.

The second reactive droop function $f_{drp\text{-}GEN\text{-}R}$ used for the correlation can be selected from a plurality of second reactive droop functions associated with the second power source 252. The second reactive droop function $f_{drp\text{-}GEN\text{-}R}$ can be selected based at least in part on one or more operating conditions 253 (FIG. 10) associated with the vehicle in which the electrical power system 201 is implemented. For instance, for an aircraft, the second reactive droop function $f_{drp\text{-}GEN\text{-}R}$ can be selected based on a phase of flight, altitude of the aircraft, number of passengers onboard the aircraft, weather conditions, a combination of the foregoing, etc.

The selected second reactive droop function $f_{drp\text{-}GEN\text{-}R}$ can be used to schedule or determine the voltage amplitude setpoint $v_{REF\_AC\text{-}GEN}$ associated with the second power source 252. More specifically, the voltage amplitude setpoint $v_{REF\_AC\text{-}GEN}$ can be determined as the y-component of the point along the second reactive droop function $f_{drp\text{-}GEN\text{-}R}$ that corresponds with the power feedback $Q_{fbk\text{-}GEN}$. In this regard, the voltage amplitude setpoint $v_{REF\_AC\text{-}GEN}$ is set as a function of the power feedback $Q_{fbk\text{-}GEN}$, which corresponds to reactive power feedback. The y-intercept of the second reactive droop function $f_{drp\text{-}GEN\text{-}R}$ selected for correlation purposes in FIG. 12 is denoted as $v_{SET\text{-}GEN}$. The power feedback $Q_{fbk\text{-}GEN}$ is bound by an inductive limit $-Q_{Max}$ and a capacitive limit $Q_{Max}$.

The voltage amplitude setpoint $v_{REF\_AC\text{-}GEN}$ is output from the reactive droop control block 918 and input into a second summation block 920. The voltage amplitude setpoint $v_{REF\_AC\text{-}GEN}$ is compared to a voltage amplitude feedback $f_{fbk\_AC\text{-}GEN}$ at the second summation block 920. The voltage amplitude feedback $f_{fbk\_AC\text{-}GEN}$ can be a measured, calculated, or predicted value indicating the voltage amplitude at the second power source 252, e.g., at output terminals thereof. A voltage amplitude difference $v_{\Delta\text{-}GEN}$ is determined at the second summation block 920, e.g., by subtracting the voltage amplitude setpoint $v_{REF\_AC\text{-}GEN}$ from the voltage amplitude feedback $f_{fbk\_AC\text{-}GEN}$ or vice versa.

The frequency difference $f_{\Delta\text{-}GEN}$ and the voltage amplitude difference $v_{\Delta\text{-}GEN}$ are input into a voltage synthesizer 908, which generates one or more outputs (e.g., a modulation index) that can be input into a switching logic control 910 that controls modulation of switching devices of the second power electronics 258, e.g., in a PWM switching scheme. Accordingly, a power output 912 of the second power source 252 is achieved. The power output 912 has an active power component and a reactive power component. The power output 912 is affected by a disturbance, which is the power demand 217 on the AC power bus 215, as represented at a third summation block 914. In alternative embodiments, the frequency difference $f_{\Delta\text{-}GEN}$ and the voltage amplitude difference $v_{\Delta\text{-}GEN}$ are each input into respective proportional-integral controls and then fed into the switching logic control 910.

Accordingly, each power controller of the power source assemblies 230 includes executable adaptive droop control logic, e.g., similar to the adaptive droop control logic 800, 900 depicted in FIGS. 11 and 12. When a given power controller executes its adaptive droop control logic, the one or more processors of the given power controller cause its associated power electronics to control the power output of its associated power source. This adaptive droop control scheme executed by each power controller of the power source assemblies 230 enables intelligent decentralized power allocation for meeting power demands on the AC power bus 215 applied by the electric power consumers 260. Specifically, implementation of the adaptive droop control scheme enables decentralized AC bus regulation according to the efficiencies of the power sources at given power outputs.

Figure 13:
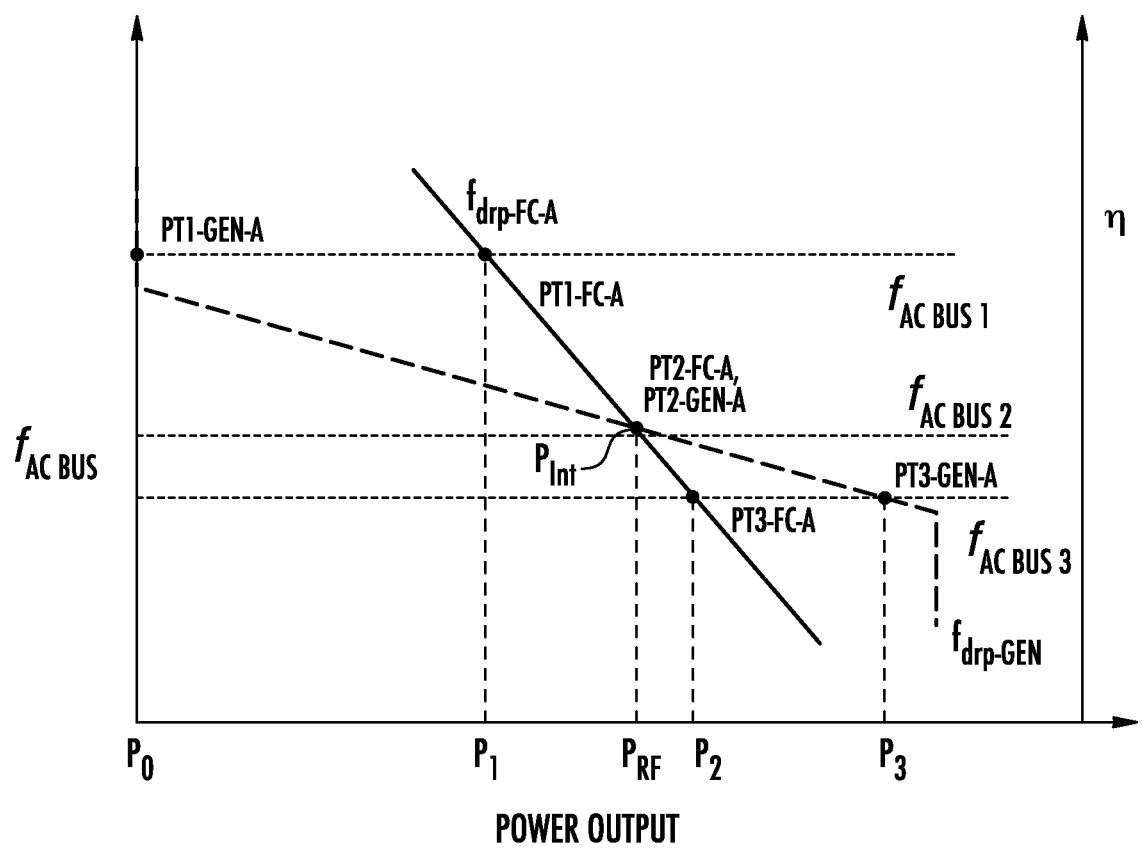
FIG. 13 provides a graph representing the first droop function associated with the first power source overlaid with the second droop function associated with the second power source on an AC bus frequency versus power output graph.

For instance, with reference to FIGS. 10 and 13, FIG. 13 provides a graph representing the first droop function $f_{drp\text{-}FC\text{-}A}$ associated with the first power source 242 overlaid with the second droop function $f_{drp\text{-}GEN\text{-}A}$ associated with the second power source 252 on an AC bus frequency versus power output graph. The first droop function $f_{drp\text{-}FC\text{-}A}$ represents an efficiency of the first power source 242 to generate active electrical power for a given power output of the first power source 242 and the second droop function $f_{drp\text{-}GEN\text{-}A}$ represents an efficiency of the second power source 252 to generate active electrical power for a given power output of the second power source 252. According, the droop functions are also functions of power output efficiency η.

As shown in FIG. 13, the active power droop functions have different slopes, with the first droop function $f_{drp\text{-}FC\text{-}A}$ having a steeper slope than the second droop function $f_{drp\text{-}GEN\text{-}A}$. Also, the droop functions intersect at a point $P_{Int}$ corresponding to a reference power level $P_{RF}$. The first power source 242, or fuel cell for this example, is more efficient at outputting electric power at lower power levels than the second power source 252, or electric machine in this example. In contrast, at higher power levels, the second power source 252 is more efficient at outputting electric power than the first power source 242. In this regard, the droop functions are coordinated so that the power output of the first power source 242, or fuel cell, is greater than the power output of the second power source 252, or electric machine, at power levels less than the reference power level $P_{RF}$ and so that the power output of the second power source 252, or electric machine, is greater than the power output of the first power source 242, or fuel cell, at power levels greater than the reference power level $P_{RF}$.

Particularly, as shown in FIG. 13, for a given AC bus frequency, the working point of both the first power source 242 and the second power source 252 will both be on the same horizontal line as the first and second power sources 242, 252 are electrically coupled to a common power bus, or AC power bus 215 in this example. For instance, for a first AC bus frequency $f_{AC\ BUS\ 1}$, the working point of the first power source 242, or fuel cell, and the working point of the second power source 252, or electric machine, are on the same horizontal line. The working point of the first power source 242 is denoted as PT1-FC-A and the working point of the second power source 252 is denoted as PT1-GEN-A. For the first AC bus frequency $f_{AC\ BUS\ 1}$, the first power source 242, or fuel cell, has a power output of P1 while the second power source 252, or electric machine, has a power output of P0.

Accordingly, the first power source 242 has a greater load share or power output at the first AC bus frequency $f_{AC\ BUS\ 1}$ than does the second power source 252. The power output of P0 is equal to zero (0) in this instance, as the y-intercept of the second droop function $f_{drp-GEN-A}$ is less than the first AC bus frequency $f_{AC\ BUS\ 1}$. Accordingly, to meet the first AC bus frequency $f_{AC\ BUS\ 1}$, only the first power source 242, or fuel cell, outputs electric power. Thus, the load share split is 100%/0%, with the first power source 242 being at 100% and the second power source 252 at 0%. Advantageously, when relatively low power is needed, such as during ground idle or taxi operations of an aircraft, the adaptive droop control scheme allows for the first power source 242, or fuel cell, to handle all or most of the relatively low power demand on the AC power bus 215. This takes advantage of the physics and characteristics of the fuel cell to operate at high efficiency at low power levels whilst also saving fuel and wear on the electric machine and gas turbine engine to which the electric machine is coupled.

For a second AC bus frequency $f_{AC\ BUS\ 2}$, which corresponds to a lower frequency level than the first AC bus frequency $f_{AC\ BUS\ 2}$, the working point of the first power source 242, or fuel cell, and the working point of the second power source 252, or electric machine, are on the same horizontal line. The working point of the first power source 242 is denoted as PT2-FC-A and the working point of the second power source 252 is denoted as PT2-GEN-A. For the second AC bus frequency $f_{AC\ BUS\ 2}$, the first power source 242, or fuel cell, and the second power source 252, or electric machine, both have the same power output, which corresponds to the reference power level $P_{RF}$. Accordingly, the first power source 242 and the second power source 252 have a same load share or power output at the second AC bus frequency $f_{AC\ BUS\ 2}$. Thus, the load share split is 50%/50%, with the first power source 242 being at 50% and the second power source 252 being at 50% to meet the power demand on the AC power bus 215.

Further, for a third AC bus frequency $f_{AC\ Bus\ 3}$, which corresponds to a lower frequency level than the second AC bus frequency $f_{AC\ BUS\ 2}$, the working point of the first power source 242, or fuel cell, and the working point of the second power source 252, or electric machine, are on the same horizontal line. The working point of the first power source 242 is denoted as PT3-FC-A and the working point of the second power source 252 is denoted as PT3-GEN-A. For the third AC bus frequency $f_{AC\ BUS\ 3}$, the first power source 242, or fuel cell, has a power output of P2 while the second power source 252, or electric machine, has a power output of P3, which is greater than the power output of P2.

Accordingly, the second power source 252 has a greater load share or power output at the third AC bus frequency $f_{AC\ BUS\ 3}$ than does the first power source 242. The load share split can be 40%/60%, with the first power source 242 being at 40% and the second power source 252 at 60%, for example. Advantageously, when relatively high power is needed, such as during flight operations of an aircraft, the adaptive droop control scheme allows for the second power source 252, or electric machine mechanically coupled with a gas turbine engine, to handle most of the relatively high power demand on the AC power bus 215. This takes advantage of the physics and characteristics of the electric machine to operate at high efficiency at high power levels whilst also using the fuel cell in part to meet the power demand on the AC power bus 215.

Accordingly, the power allocation for the power sources is set according to the characteristics of the droop functions, such as their slopes, y-intercepts, and overall shapes. For the depicted embodiment of FIG. 13, as the droop functions converge toward one another, the load share between the first power source 242 and the second power source 252 becomes more balanced, as represented at the second AC bus frequency $f_{AC\ BUS\ 2}$. Conversely, as the droop functions diverge away from one another, the load share between the first power source 242 and the second power source 252 becomes less balanced, as represented at the first AC bus frequency $f_{AC\ BUS\ 1}$ and the third AC bus frequency $f_{AC\ BUS\ 3}$.

It will be appreciated that, like the active power allocation scheme disclosed above and represented in FIG. 13, reactive power allocation for the power sources can be set according to the coordination and characteristics of the reactive droop functions, such as their slopes, y-intercepts, and overall shapes.

Moreover, in some embodiments, the reactive power control aspects of the adaptive droop control logic 800, 900 are optionally not implemented or not a part of the adaptive droop control logic 800, 900. In such embodiments, a voltage regulating device can be employed to regulate the voltage on the AC power bus 215.

Further, the droop functions depicted in FIGS. 11, 12, and 13, are linear functions. However, one or more of the droop functions can be non-linear functions in other example embodiments. In other embodiments, one or more of the droop functions may be piecewise linear functions, polynomial functions, etc.

In accordance with the adaptive droop control schemes disclosed herein, such control schemes can also be deemed "adaptive" in that droop functions selected for correlation purposes can be selected or otherwise adjusted based on a health status of one or more of the power sources or components associated therewith, such as their respective power controllers, and particularly, their respective power electronics.

By way of example and with reference to FIG. 5, for a given power demand and operating conditions of the vehicle in with the electrical power system 200 is implemented, the one or more processors of the first controller 246 can receive a health status 245 associated with the first power source 242 and/or the first power controller 244, wherein the health status 245 indicates a degree of degradation from a baseline health status, such as a new condition first power source and/or new condition first power electronics. Likewise, for a given power demand and operating conditions of the vehicle in which the electrical power system 200 is implemented, the one or more processors of the second controller 256 can receive a health status 255 associated with the second power source 252 and/or the second power controller 254, wherein the health status 255 indicates a degree of degradation from a baseline health status, such as a new condition second power source and/or new condition second power electronics.

Figure 14:
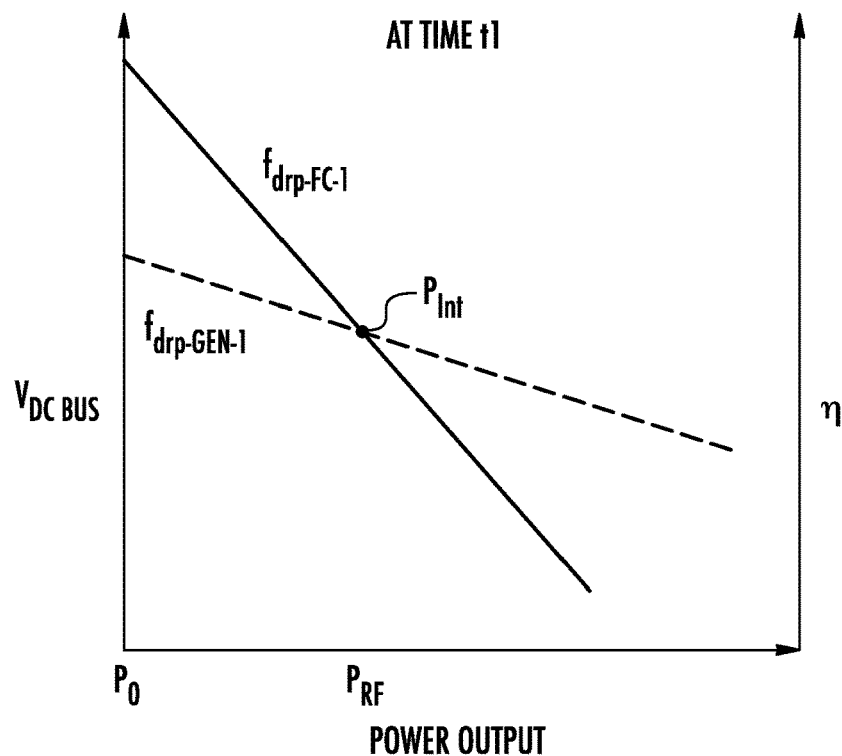
FIG. 14 provides a graph depicting a first droop function associated with a first power source overlaid with a second droop function associated with a second power source of an electrical power system.
Figure 15:
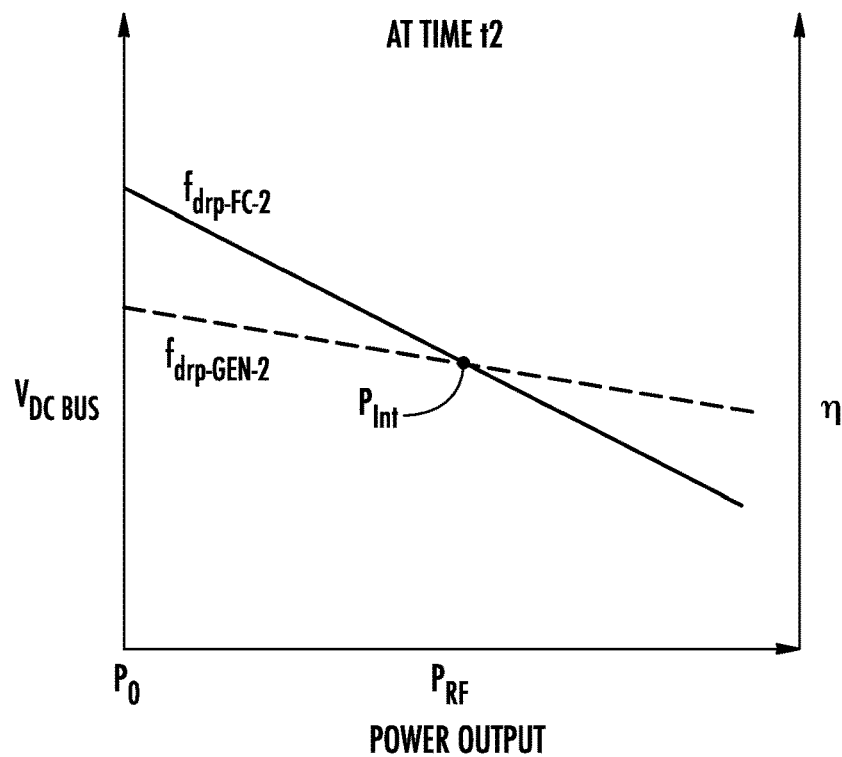
FIG. 15 provides a graph depicting a first droop function associated with a first power source overlaid with a second droop function associated with a second power source of an electrical power system.

With reference now to FIGS. 14 and 15 in addition to FIG. 5, FIG. 14 provides a graph depicting a first droop function $f_{drp-FC-1}$ associated with the first power source 242 overlaid with a second droop function $f_{drp-GEN-1}$ associated with the second power source 252 of the electrical power system 200 of FIG. 5, the first droop function $f_{drp-FC-1}$ and the second droop function $f_{drp-GEN-1}$ being selected based on a first set of operating conditions and at a first time t1 at which the first power source 242 has a first health status indicating a first level of health and the second power source 252 has a first health status indicating a first level of health. FIG. 15 provides a graph depicting a first droop function $f_{drp\text{-}FC\text{-}2}$ associated with the first power source 242 overlaid with a second droop function $f_{drp\text{-}GEN\text{-}2}$ associated with the second power source 252 of the electrical power system 200 of FIG. 5, the first droop function $f_{drp\text{-}FC\text{-}2}$ and the second droop function $f_{drp\text{-}GEN\text{-}2}$ being selected based on the first set of operating conditions (the same operating conditions as in FIG. 14) and at a second time t2 that is later in time than time t1 of FIG. 14. At time t2, the first power source 242 has a second health status indicating a second level of health and the second power source 252 has a second health status indicating a second level of health. The second health status of the first and second power sources 242, 252 indicates greater deterioration from a baseline health status compared to the first health status of the first and second power sources 242, 252.

In comparing the first droop function of FIG. 14 with the first droop function of FIG. 15, the first droop function of FIG. 14, which represents the efficiency of the first power source at time t1 and for the first set of operating conditions, is steeper than the first droop function of FIG. 15, which represents the efficiency of the first power source at time t2 and for the first set of operating conditions. In this regard, the first droop function selected for correlation purposes is adapted or intelligently selected as the first power source deteriorates over time. Likewise, in comparing the second droop function of FIG. 14 with the second droop function of FIG. 15, the second droop function of FIG. 14, which represents the efficiency of the second power source at time t1 and for the first set of operating conditions, is steeper than the second droop function of FIG. 15, which represents the efficiency of the second power source at time t2 and for the first set of operating conditions. Accordingly, the second droop function selected for correlation purposes is adapted or intelligently selected as the second power source deteriorates over time.

As will further be appreciated by comparing FIG. 14 and FIG. 15, the first and second droop functions of FIG. 14 diverge more significantly as they move away from the reference power level $P_{RF}$ than do the first and second droop functions of FIG. 15. Moreover, the reference power level $P_{RF}$ has shifted to the right in FIG. 15 along the X-axis from its position in FIG. 14. These differences indicate the adaptive power allocation of the power sources over time made possible by the adaptive droop control scheme when accounting for the health status of the power sources. It will be appreciated that the teachings relating to accounting for health status in selecting a droop function for correlation purposes applies equally to AC power bus systems, such as the electrical power system 201 of FIG. 10.

Figure 16:
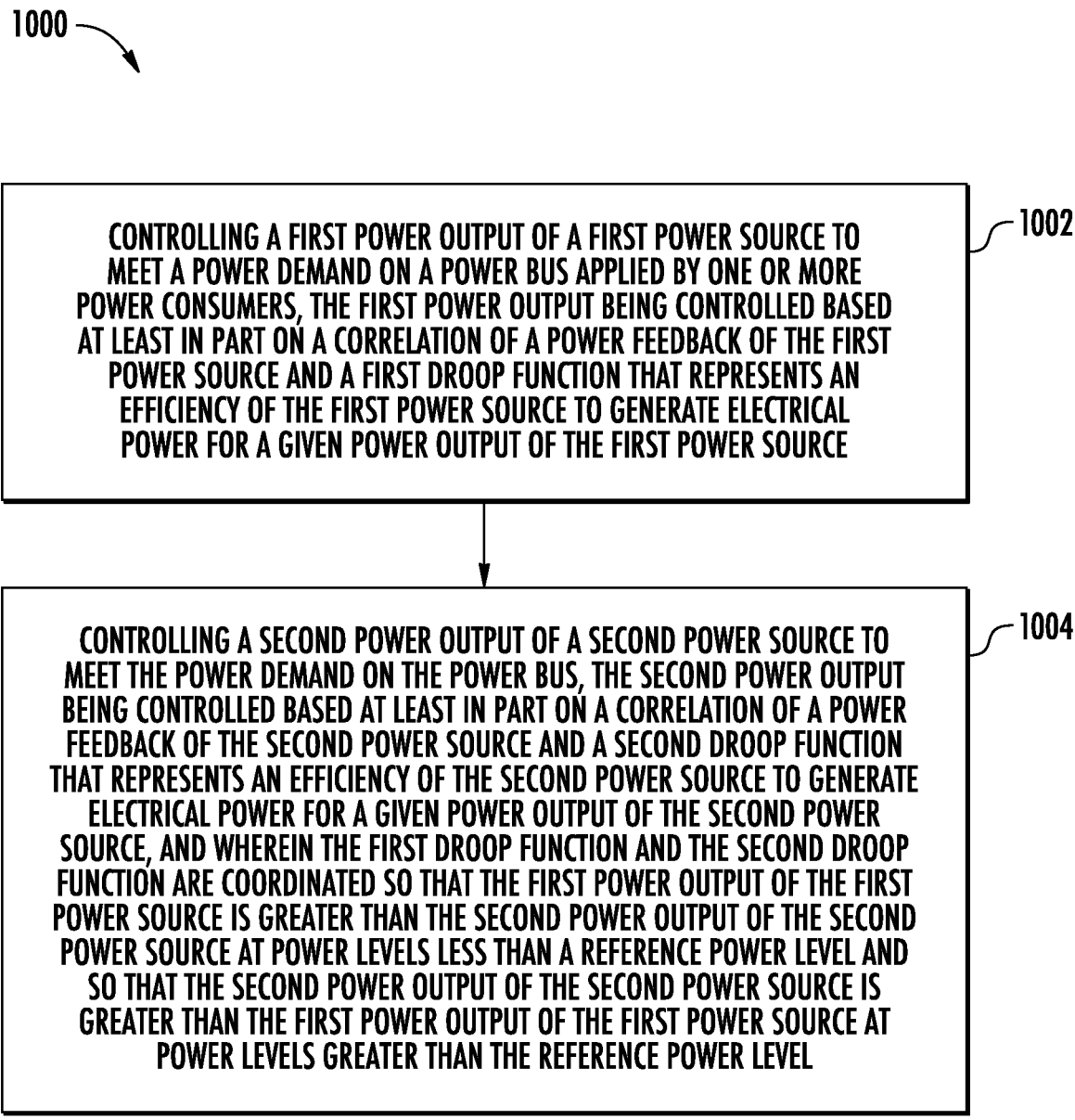
FIG. 16 is a flow diagram of a method of operating a decentralized power allocation system for an aircraft in accordance with an example aspect of the present disclosure.

FIG. 16 provides a flow diagram of a method 1000 of operating a decentralized power allocation system for an aircraft. For instance, the method 1000 can be utilized to operate the electrical power systems 200, 201 of FIG. 5 or FIG. 10.

At 1002, the method 1000 includes controlling a first power output of a first power source to meet a power demand on a power bus applied by one or more power consumers, the first power output being controlled based at least in part on a correlation of a power feedback of the first power source and a first droop function that represents an efficiency of the first power source to generate electrical power for a given power output of the first power source. For instance, a first power controller associated with the first power source can control the first power output of the first power source. One or more processors of the first power controller can receive the power feedback of the first power source and can correlate the power feedback to the first droop function. As one example, the power feedback can be compared to a power setpoint to determine a power difference. The power difference can be used to adjust, if necessary, the power feedback from a previous timestep of the one or more processors. The adjusted power feedback is then correlated with the first droop function.

In implementations where the power bus is a direct current power bus, a voltage setpoint is determined based on the correlation between the adjusted power feedback and the first droop function. First power electronics of the first power controller (e.g., switches thereof) can be controlled based on the voltage setpoint to output the first power output. In implementations where the power bus is an alternating current power bus, a frequency setpoint is determined based on the correlation between the adjusted power feedback and the first droop function. The first power electronics of the first power controller (e.g., switches thereof) can be controlled based on the frequency setpoint to output the first power output. In some instances, the first power output is not equal to zero (0). In such instances, the first power source has a load share in meeting the power demand on the power bus. In other instances, the first power output can be equal to zero. In this regard, in some instances, the load share of the first power source in meeting the power demand on the power bus is zero (0).

At 1004, the method 1000 includes controlling a second power output of a second power source to meet the power demand on the power bus, the second power output being controlled based at least in part on a correlation of a power feedback of the second power source and a second droop function that represents an efficiency of the second power source to generate electrical power for a given power output of the second power source, and wherein the first droop function and the second droop function are coordinated so that the first power output of the first power source is greater than the second power output of the second power source at power levels less than a reference power level and so that the second power output of the second power source is greater than the first power output of the first power source at power levels greater than the reference power level.

For instance, a second power controller associated with the second power source can control the second power output of the second power source. One or more processors of the second power controller can receive the power feedback of the second power source and can correlate the power feedback to the second droop function. As one example, the power feedback can be compared to a power setpoint to determine a power difference. The power difference can be used to adjust, if necessary, the power feedback from a previous timestep of the one or more processors of the second power controller. The adjusted power feedback is then correlated with the second droop function.

In implementations where the power bus is a direct current power bus, a voltage setpoint is determined based on the correlation between the adjusted power feedback and the second droop function. Second power electronics of the second power controller (e.g., switches thereof) can be controlled based on the voltage setpoint to output the second power output. In implementations where the power bus is an alternating current power bus, a frequency setpoint is determined based on the correlation between the adjusted power feedback and the second droop function. The second power electronics of the second power controller (e.g., switches thereof) can be controlled based on the frequency setpoint to output the second power output. In some instances, the second power output is not equal to zero (0). In such instances, the second power source has a load share in meeting the power demand on the power bus. In other instances, the second power output can be equal to zero. In this regard, in some instances, the load share of the second power source in meeting the power demand on the power bus is zero (0).

In some implementations, the power bus is an alternating current power bus, and wherein the reference power level corresponds to a point at which the first droop function and the second droop function intersect, wherein the first and second droop functions are represented as functions of a frequency of the alternating current power bus versus power output of the first and second power sources. In other implementations, the power bus is a direct current power bus, and wherein the reference power level corresponds to a point at which the first droop function and the second droop function intersect, wherein the first and second droop functions are represented as functions of a voltage of the direct current power bus versus power output of the first and second power sources.

In some implementations, the first power source is a fuel cell assembly and the second power source is an electric machine mechanically coupled with a gas turbine engine. In other implementations, the first power source is a first fuel cell assembly and the second power source is a second fuel assembly. In some further implementations, the first power source is a first electric machine mechanically coupled with a first gas turbine engine and the second power source is a second electric machine mechanically coupled with a second gas turbine engine.

Figure 17:
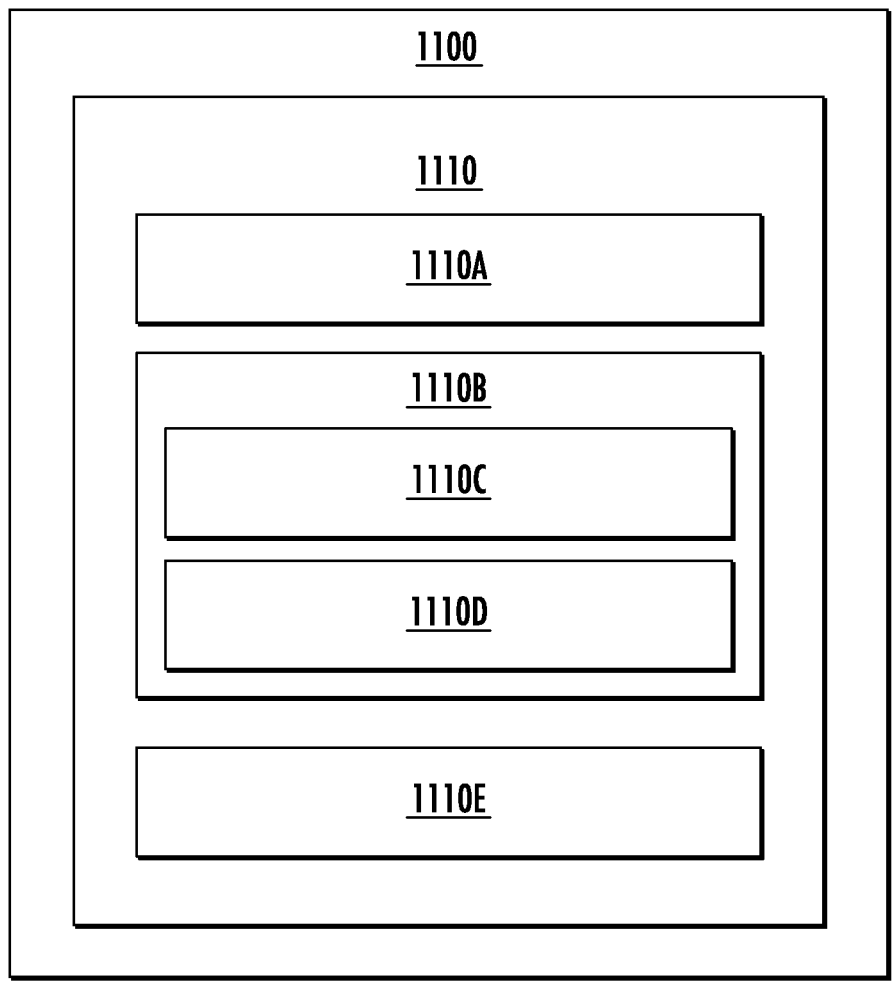
FIG. 17 provides a computing system according to example embodiments of the present disclosure.

FIG. 17 provides a computing system 1100 according to example embodiments of the present disclosure. The computing devices or elements described herein, such as the controllers 246, 256 (FIG. 5 and FIG. 10), may include various components and perform various functions of the computing system 1100 provided below.

The computing system 1100 can include one or more computing device(s) 1110. The computing device(s) 1110 can include one or more processor(s) 1110A and one or more memory device(s) 1110B. The one or more processor(s) 1110A can include any suitable processing device, such as a microprocessor, microcontroller, integrated circuit, logic device, and/or other suitable processing device. The one or more memory device(s) 1110B can include one or more computer-executable or computer-readable media, including, but not limited to, non-transitory computer-readable medium, RAM, ROM, hard drives, flash drives, and/or other memory devices.

The one or more memory device(s) 1110B can store information accessible by the one or more processor(s) 1110A, including computer-readable instructions 1110C that can be executed by the one or more processor(s) 1110A. The instructions 1110C can be any set of instructions that, when executed by the one or more processor(s) 1110A, cause the one or more processor(s) 1110A to perform operations, such executing adaptive droop control schemes. The instructions 1110C can be software written in any suitable programming language or can be implemented in hardware. Additionally, and/or alternatively, the instructions 1110C can be executed in logically and/or virtually separate threads on processor(s) 1110A. The memory device(s) 1110B can further store data 1110D that can be accessed by the processor(s) 1110A. For example, the data 1110D can include models, lookup tables, databases, etc., and particularly, sets of droop control functions.

The computing device(s) 1110 can also include a network interface 1110E used to communicate, for example, with the other components of the computing system 1100 (e.g., via a communication network). The network interface 1110E can include any suitable components for interfacing with one or more network(s), including for example, transmitters, receivers, ports, controllers, antennas, and/or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A decentralized power allocation system for an aircraft, comprising: a power bus; one or more electric power consumers electrically coupled with the power bus; and a plurality of power source assemblies, each one of the plurality of power source assemblies comprising: a power source electrically coupled with the power bus; and a power controller for controlling electrical power provided from the power source to the power bus, the power controller having power electronics and one or more processors configured to: cause the power electronics to control a power output of the power source to meet a power demand on the power bus applied by the one or more electric power consumers in accordance with an adaptive droop control scheme in which the power output of the power source is controlled based at least in part on a correlation of a power feedback of the power source and a droop function that represents an efficiency of the power source to generate electrical power for a given power output of the power source.

The decentralized power allocation system of any preceding clause, wherein the droop functions associated with the power sources are coordinated with one another so that the power output of a first power source of the power sources is greater than the power output of a second power source of the power sources at power levels less than a reference power level and so that the power output of the second power source is greater than the power output of the first power source at power levels greater than the reference power level.

The decentralized power allocation system of any preceding clause, wherein, at a first power level that is less than the reference power level, the power output of the first power source and the power output of the second power source define a load share split of 100%/0% between the first power source and the second power source to meet the power demand.

The decentralized power allocation system of any preceding clause, wherein, at a second power level that is less than the reference power level but greater than the first power level, the power output of the first power source and the power output of the second power source define a load share split of 60%/40% between the first power source and the second power source to meet the power demand.

The decentralized power allocation system of any preceding clause, wherein, at a third power level that is greater than the reference power level, the power output of the first power source and the power output of the second power source define a load share split of 40%/60% between the first power source and the second power source to meet the power demand.

The decentralized power allocation system of any preceding clause, wherein, at a fourth power level that is greater than the reference power level, the power output of the first power source and the power output of the second power source define a load share split of 20%/80% between the first power source and the second power source to meet the power demand.

The decentralized power allocation system of any preceding clause, wherein the droop functions associated with the power sources are coordinated with one another so that the power output of the first power source and the power output of the second power source are equal to one another at the reference power level.

The decentralized power allocation system of any preceding clause, wherein the power output of the first power source and the power output of the second power source are equal to one another at the reference power level so as to define a load share split of 50%/50% between the first power source and the second power source to meet the power demand.

The decentralized power allocation system of any preceding clause, wherein the first power source is a fuel cell assembly and the second power source is an electric machine.

The decentralized power allocation system of any preceding clause, wherein the electric machine is mechanically coupled with a gas turbine engine.

The decentralized power allocation system of any preceding clause, wherein the reference power level corresponds to a power level at which the droop function associated with the first power source intersects with the droop function associated with the second power, and wherein the power output of the first power source and the power output of the second power source are the same at the reference power level.

The decentralized power allocation system of any preceding clause, wherein the one or more processors of each of the power controllers is configured to: select the droop function from a plurality of droop functions based at least in part on one or more operating conditions associated with the aircraft.

The decentralized power allocation system of any preceding clause, wherein the one or more operating conditions include a flight phase.

The decentralized power allocation system of any preceding clause, wherein the one or more operating conditions include a health status of the power source and/or the power controller.

The decentralized power allocation system of any preceding clause, wherein the power bus is a direct current power bus.

The decentralized power allocation system of any preceding clause, wherein the droop functions are functions of voltage.

The decentralized power allocation system of any preceding clause, wherein the power bus is an alternating current power bus.

The decentralized power allocation system of any preceding clause, wherein the droop functions are active power droop functions that are functions of frequency.

The decentralized power allocation system of any preceding clause, wherein the droop functions are reactive power droop functions that are functions of voltage.

The decentralized power allocation system of any preceding clause, wherein the droop functions are linear functions having different slopes or wherein at least one of the droop functions is a non-linear function.

The decentralized power allocation system of any preceding clause, wherein the first droop function is a non-linear function and the second droop function is a linear or piecewise linear function.

The decentralized power allocation system of any preceding clause, wherein the first droop function is a curved, non-linear function and the second droop function is a linear or piecewise linear function.

A method of operating a decentralized power allocation system for an aircraft, comprising: controlling a first power output of a first power source to meet a power demand on a power bus applied by one or more power consumers, the first power output being controlled based at least in part on a correlation of a power feedback of the first power source and a first droop function that represents an efficiency of the first power source to generate electrical power for a given power output of the first power source; and controlling a second power output of a second power source to meet the power demand on the power bus, the second power output being controlled based at least in part on a correlation of a power feedback of the second power source and a second droop function that represents an efficiency of the second power source to generate electrical power for a given power output of the second power source, and wherein the first droop function and the second droop function are coordinated so that the first power output of the first power source is greater than the second power output of the second power source at power levels less than a reference power level and so that the second power output of the second power source is greater than the first power output of the first power source at power levels greater than the reference power level.

The method of any preceding clause, wherein the first power source is a fuel cell assembly and the second power source is an electric machine mechanically coupled with a gas turbine engine.

The method of any preceding clause, wherein the power bus is an alternating current power bus, and wherein the reference power level corresponds to a point at which the first droop function and the second droop function intersect, wherein the first and second droop functions are represented as functions of a frequency of the alternating current power bus versus power output of the first and second power sources.

The method of any preceding clause, wherein the power bus is a direct current power bus, and wherein the reference power level corresponds to a point at which the first droop function and the second droop function intersect, wherein the first and second droop functions are represented as functions of a voltage of the direct current power bus versus power output of the first and second power sources.

The method of any preceding clause, wherein the first power source is a first fuel cell assembly and the second power source is a second fuel assembly.

A decentralized power allocation system for an aircraft, comprising: a power bus; one or more electric power consumers electrically coupled with the power bus; a first power source assembly having a fuel cell electrically coupled with the power bus and a first power controller having first power electronics and one or more processors configured to execute adaptive droop control logic so as to cause the first power electronics to control a power output of the fuel cell based at least in part on a first droop function that represents an efficiency of the fuel cell to generate electrical power for a given power output of the fuel cell; and a second power source assembly having an electric machine electrically coupled with the power bus and mechanically coupled with a gas turbine engine, the second power source assembly also including a second power controller having second power electronics and one or more processors configured to execute adaptive droop control logic so as to cause the second power electronics to control a power output of the electric machine based at least in part on a second droop function that represents an efficiency of the electric machine to generate electrical power for a given power output of the electric machine, and wherein the first droop function and the second droop function intersect at a point corresponding to a reference power level and are coordinated so that the power output of the fuel cell is greater than the power output of the electric machine at power levels less than the reference power level and so that the power output of the electric machine is greater than the power output of the fuel cell at power levels greater than the reference power level.

We claim:

1. A decentralized power allocation system for an aircraft, comprising:
   a power bus;
   one or more electric power consumers electrically coupled with the power bus; and
   a plurality of power source assemblies, each one of the plurality of power source assemblies comprising:
      a power source electrically coupled with the power bus; and
      a power controller for controlling electrical power provided from the power source to the power bus, the power controller having power electronics and one or more processors configured to:
         cause the power electronics to control a power output of the power source to meet a power demand on the power bus applied by the one or more electric power consumers in accordance with an adaptive droop control scheme in which the power output of the power source is controlled based at least in part on a correlation of a power feedback of the power source and a droop function that represents an efficiency of the power source to generate electrical power for a given power output of the power source;
   wherein the droop functions associated with the power sources are coordinated with one another so that the power output of a first power source of the power sources is greater than the power output of a second power source of the power sources at power levels less than a reference power level and so that the power output of the second power source is greater than the power output of the first power source at power levels greater than the reference power level.

2. The decentralized power allocation system of claim 1, wherein the first power source is a fuel cell assembly and the second power source is an electric machine.

3. The decentralized power allocation system of claim 2, wherein the electric machine is mechanically coupled with a gas turbine engine.

4. The decentralized power allocation system of claim 1, wherein the reference power level corresponds to a power level at which the droop function associated with the first power source intersects with the droop function associated with the second power, and wherein the power output of the first power source and the power output of the second power source are the same at the reference power level.

5. The decentralized power allocation system of claim 1, wherein the one or more processors of each of the power controllers is configured to:
   select the droop function from a plurality of droop functions based at least in part on one or more operating conditions associated with the aircraft.

6. The decentralized power allocation system of claim 5, wherein the one or more operating conditions include a flight phase.

7. The decentralized power allocation system of claim 5, wherein the one or more operating conditions include a health status of the power source and/or the power controller.

8. The decentralized power allocation system of claim 1, wherein the power bus is a direct current power bus.

9. The decentralized power allocation system of claim 8, wherein the droop functions are functions of voltage.

10. The decentralized power allocation system of claim 1, wherein the power bus is an alternating current power bus.

11. The decentralized power allocation system of claim 10, wherein the droop functions are active power droop functions that are functions of frequency.

12. The decentralized power allocation system of claim 10, wherein the droop functions are reactive power droop functions that are functions of voltage.

13. The decentralized power allocation system of claim 1, wherein the droop functions are linear functions having different slopes or wherein at least one of the droop functions is a non-linear function.

14. A method of operating a decentralized power allocation system for an aircraft, comprising:
   controlling a first power output of a first power source to meet a power demand on a power bus applied by one or more power consumers, the first power output being controlled based at least in part on a correlation of a power feedback of the first power source and a first droop function that represents an efficiency of the first power source to generate electrical power for a given power output of the first power source; and
   controlling a second power output of a second power source to meet the power demand on the power bus, the second power output being controlled based at least in part on a correlation of a power feedback of the second power source and a second droop function that represents an efficiency of the second power source to generate electrical power for a given power output of the second power source, and
   wherein the first droop function and the second droop function are coordinated so that the first power output of the first power source is greater than the second power output of the second power source at power levels less than a reference power level and so that the second power output of the second power source is greater than the first power output of the first power source at power levels greater than the reference power level.

15. The method of claim 14, wherein the first power source is a fuel cell assembly and the second power source is an electric machine mechanically coupled with a gas turbine engine.

16. The method of claim 14, wherein the power bus is an alternating current power bus, and wherein the reference power level corresponds to a point at which the first droop function and the second droop function intersect, wherein the first and second droop functions are represented as functions of a frequency of the alternating current power bus versus power output of the first and second power sources.

17. The method of claim 14, wherein the power bus is a direct current power bus, and wherein the reference power level corresponds to a point at which the first droop function and the second droop function intersect, wherein the first and second droop functions are represented as functions of a voltage of the direct current power bus versus power output of the first and second power sources.

18. The method of claim 14, wherein the first power source is a first fuel cell assembly and the second power source is a second fuel assembly.

19. A decentralized power allocation system for an aircraft, comprising:
   a power bus;
   one or more electric power consumers electrically coupled with the power bus;
   a first power source assembly having a fuel cell electrically coupled with the power bus and a first power controller having first power electronics and one or more processors configured to execute adaptive droop control logic so as to cause the first power electronics to control a power output of the fuel cell based at least in part on a first droop function that represents an efficiency of the fuel cell to generate electrical power for a given power output of the fuel cell; and
   a second power source assembly having an electric machine electrically coupled with the power bus and mechanically coupled with a gas turbine engine, the second power source assembly also including a second power controller having second power electronics and one or more processors configured to execute adaptive droop control logic so as to cause the second power electronics to control a power output of the electric machine based at least in part on a second droop function that represents an efficiency of the electric machine to generate electrical power for a given power output of the electric machine, and
   wherein the first droop function and the second droop function intersect at a point corresponding to a reference power level and are coordinated so that the power output of the fuel cell is greater than the power output of the electric machine at power levels less than the reference power level and so that the power output of the electric machine is greater than the power output of the fuel cell at power levels greater than the reference power level.

* * * * *